(12) United States Patent
Ferraiolo et al.

(10) Patent No.: US 11,062,044 B2
(45) Date of Patent: *Jul. 13, 2021

(54) ACCESS CONTROL SYSTEM AND PROCESS FOR MANAGING AND ENFORCING AN ATTRIBUTE BASED ACCESS CONTROL POLICY

(71) Applicant: Government of the United States of America, as represented by the Secretary of Commerce, Gaithersburg, MD (US)

(72) Inventors: David F. Ferraiolo, Leesburg, VA (US); Gopi Katwala, Gaithersburg, MD (US); Serban Gavrila, Chevy Chase, MD (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/817,492

(22) Filed: Mar. 12, 2020

(65) Prior Publication Data
US 2020/0272752 A1    Aug. 27, 2020

Related U.S. Application Data

(63) Continuation of application No. 15/899,485, filed on Feb. 20, 2018, now Pat. No. 10,719,617.

(60) Provisional application No. 62/490,166, filed on Apr. 26, 2017.

(51) Int. Cl.
| | | |
|---|---|---|
| H04L 29/06 | (2006.01) | |
| G06F 21/62 | (2013.01) | |
| G06F 16/2455 | (2019.01) | |

(52) U.S. Cl.
CPC ...... G06F 21/6218 (2013.01); G06F 16/2455 (2019.01)

(58) Field of Classification Search
CPC . G06F 21/6218; H04L 63/101; H04L 63/104; H04L 63/105; H04L 63/205
USPC .......................................................... 726/1
See application file for complete search history.

(56) References Cited

U.S. PATENT DOCUMENTS 9,264,451 B2 * 2/2016 Chari ................. H04L 63/20
9,973,509 B2 * 5/2018 Martinelli ........... H04L 63/101

OTHER PUBLICATIONS

NPL—Ferraiolo et al.—The Role Control Center: Features and case Studies, ACM p. 12-20, Jun. 2-3, 2003.*
BMC Server Automation 8.9, 2016, URL: https://docs.bmc.com/docs/display/bsa89/Home.
(Continued)

*Primary Examiner* — Longbit Chai
(74) *Attorney, Agent, or Firm* — Office of Chief Counsel for National Institute of Standards and Technology

(57) ABSTRACT

An access control system for managing and enforcing an attribute based access control (ABAC) policy includes: a minimum ABAC implementation that produces a representation access control list in an ABAC policy system; and a local host system that produces a resource repository access control list in the local host system such that the resource repository access control list is based on the representation access control list.

11 Claims, 14 Drawing Sheets

(56) References Cited

OTHER PUBLICATIONS

Ferraiolo, D., et al., "A Sysytem for Centralized ABAC Policy Administration and Local ABAC Policy Decision and Enforcement in Host Systems using Access Control Lists", ACM, 2018, p. 35-42.
Ferraiolo, D., et al., "The Role Control Center: Features and Case Studies", ACM, 2003, p. 12-20.
Buecker, A., et al., "Enterprise Security Architecture: Using IBM Tivoli Security Solution", 2007.

* cited by examiner (u1, r, o1), (u1, w, o1), (u2, r, o2), (u2, w, o2), (u2, r, loan-1), (u2, w, loan-1), (u3, r, o2), (u3, w, o2), (u3, r, loan-1), (u3, w, loan-1), (u1, c-ooa, Accounts 1), (u1, d-ooa, Accounts 1), (u2, c-ooa, Loans 1), (u2, d-ooa, Loans 1), (u3, c-ooa, Loans 2), (u3, d-ooa, Loans 2), (u4, r, o1), (u4, r, o2), (u4, r, o3), (u4, r, loan-1)

Figure 5 loan-1: Custom gr1, r; gr2, w -- where gr1=u2, u3, u4, and gr2=u3

Figure 7

Loans 2: Custom
    file (inherit) – gr3, r; gr4, w
    Directory – gr3, r (list); gr5, w (create/delete children) --
        where gr3=u2, u3, u4; gr4=u2, u3; and gr5=u3

Figure 8

Loans 1: Custom
    file (inherit) – gr6, r; gr7, w
    directory – gr6, r (list); gr8, w (create/delete children) --
        where gr6=u2, u3, u4; gr7=u2, u3; gr8=u2

Accounts 1: Custom
    file (inherit) – gr9, r; gr10, w
    directory – gr9, r (list); gr11, w (create/delete children) --
        where gr9=u1, u4; gr10=u1; gr11=u1

Figure 9

Loans: Custom
    directory – gr12, r (list) --
        where gr12=u2, u3, u4

Accounts: Custom
    directory – gr13, r (list) --
        where gr13=u1, u4

Products: Custom
    directory – gr14, r (list) --
        where gr14=u1, u2, u3, u4

Figure 10

ACCESS CONTROL SYSTEM AND PROCESS FOR MANAGING AND ENFORCING AN ATTRIBUTE BASED ACCESS CONTROL POLICY

CROSS REFERENCE TO RELATED APPLICATIONS

This application is continuation of U.S. patent application Ser. No. 15/899,485, filed Feb. 20, 2018, and claims the benefit of U.S. Provisional Patent Application Ser. No. 62/490,166, filed Apr. 26, 2017, the disclosures of each of which are incorporated herein by reference in their entirety.

STATEMENT REGARDING FEDERALLY SPONSORED RESEARCH

This invention was made with United States Government support from the National Institute of Standards and Technology (NIST), an agency of the United States Department of Commerce. The Government has certain rights in the invention. Licensing inquiries may be directed to the Technology Partnerships Office, NIST, Gaithersburg, Md., 20899; voice (301) 301-975-2573; email tpo@nist.gov; reference NIST Docket Number 17-027CON1.

BRIEF DESCRIPTION

Disclosed is an access control system for managing and enforcing an attribute based access control (ABAC) policy, the access control system comprising: a minimum ABAC implementation that produces a representation access control list (RACL) in an ABAC policy system, such that the RACL is produced exclusively by the minimum ABAC implementation, and the production of the RACL is based on the ABAC policy, and the ABAC policy conforms to next generation access control (NGAC) in accordance with ANSI INCITS 525 (December 2017); and a local host system that produces a resource repository access control list (RRACL) in the local host system such that the RRACL is based on the RACL.

Also disclosed is an access control system for managing and enforcing an attribute based access control (ABAC) policy, the access control system comprising: a control center that: receives an administrative command; produces a policy command; produces an engine command; and produces an agent command; a minimum ABAC implementation in communication with the control center and comprising: a policy and attribute administration point that: receives the policy command from the control center; and produces a builder command in response to receipt of the policy command; a policy analytics engine that: receives the engine command from the control center; produces an analytics command in response to receipt of the engine command; and produces a representation access control list (RACL) for an object or an object attribute, the object or the object attribute being a representation of and a one-to-one correspondence to a resource repository in a file system on a local host system, the local host system protecting the resource repository based on the RRACL that corresponds to a RACL; a policy database that: receives the builder command from the policy and attribute administration point; produces an ABAC attribute, based on the builder command; produces an ABAC policy, based on the builder command and the ABAC attribute; stores the ABAC attribute and the ABAC policy; produces the object that is assigned to the object attribute, based on the builder command; produces a user attribute, based on the builder command; receives the analytics command from the policy analytics engine; and reviews the ABAC policy and the ABAC attribute, based on analytics command; and a local host system in communication with the control center and comprising: an agent, running with administrative privileges, that: receives the agent command from the control center; and produces a file command and an access command in response to receipt of the agent command, the file command comprising: an instruction to navigate the resource repository on the file system; and an instruction to select the resource repository on the file system to be subject to protection by the local host system, based on the RACL; and the file system comprising the resource repository and that receives the file command; and an access control system that: receives the access command from the agent; and produces a resource repository access control list (RRACL) based on the RACL, the RRACL comprising a group that comprises a user.

Further disclosed is a process for managing and enforcing an attribute based access control (ABAC) policy, the process comprising: expressing the ABAC policy, wherein the ABAC policy defines privileges of a user, or privileges and prohibitions, of the user using a policy and attribute administration point for configuring authorization data of a centralized ABAC system, the centralized ABAC system defining policies in terms of objects and object attributes; introducing a representation of a resource repository into an expression of the ABAC policy as objects or object attributes, the resource repository to be protected in a local host system that protects data using a resource repository access control list (RRACL); establishing a one-to-one correspondence between the resource repository and the representation of the resource repository; formulating a representation access control list (RACL) for the representation in accordance with the ABAC policy by determining a group of users that can exercise an access right relevant for the representation, the access right comprising an action performable on a resource repository, the action comprising read, write, list, create, or delete; producing a local group on the local host system, the local group comprising a user member and a local group corresponding to a group in the RACL; hosting, on the local host system, the resource repository that corresponds to the representation; producing, with agent software, a user account if the user account does not exist for the user member of the local group on the local host system that hosts the resource repository corresponding to the representation, the local group and the user member corresponding to a user and a group in the RACL; and producing the RRACL on the resource repository corresponding to the representation using the RACL for the representation and agent software.

Disclosed also is a process for managing and enforcing an attribute based access control (ABAC) policy, the process comprising: receiving, by a control center, an administrative command from an administrator; producing, by the control center, a policy command in response to receipt of an administrative command relevant to a policy and attribute administration point; receiving, by the policy and attribute administration point, the policy command from the control center; producing, by the policy and attribute administration point, a builder command in response to receipt of the policy command; receiving, by a policy database, the builder command for configuring the ABAC policy and an ABAC attribute to include creation and deletion of an object attribute and an object assigned to the object attribute and a user attribute and a user assigned to the user attribute in the policy database; producing, by the policy database, a builder database response in response to receipt of the builder command for viewing a current state of the ABAC policy and the ABAC attribute in the policy database; receiving, by the policy and attribute administration point, the builder database response from the policy database; producing, by the policy and attribute administration point, a builder response in response to receipt of the builder database response; communicating the builder response from the policy and attribute administration point to the control center; producing, by the control center, an engine command in response to receipt of an administrative command relevant to the policy analytics engine; receiving, by a policy analytics engine, the engine command from the control center; producing, by the policy analytics engine, an analytics command in response to receipt of the engine command; receiving, by the policy database, the analytics command for review of the ABAC policy and the ABAC attribute for determining a resource access control list (RACL) for the object or the object attribute that represents and corresponds to a resource repository in a local host system that protects the resource repository using a resource repository access control list (RRACL); producing, by the policy database, an analytics database response in response to receipt of the analytics command, the analytics database response comprising the RACL; receiving, by the policy analytics engine, the analytics database response from the policy database; producing, by the policy analytics engine, an engine response in response to receipt of the analytics database response; communicating the engine response from the policy analytics engine to the control center; receiving, by an agent on the local host system, the agent command; producing, by the agent, a file command in response to receipt of the agent command relevant to the file system on the local host system; receiving, by a file system, the file command from the agent for viewing the resource repository and identifying the resource repository on the file system for protection; producing, by the file system, a file response in response to receipt of the file command; producing, by the agent, an access command in response to receipt of the agent command relevant to the access control system on the local host system; receiving, by an access control system, the access command from the agent; producing, by the access control system, an access response in response to receipt of the access command; producing, by the agent, an agent response in response to receipt of the file response or the access response; and communicating the agent response from the agent to the control center to manage and enforce the ABAC policy.

Further also is disclosed a process for managing and enforcing an attribute based access control (ABAC) policy, the process comprising: receiving, by a control center, an administrative command from an administrator; producing, by the control center, a policy command, an engine command, and an agent command in response to receipt of the administrative command; communicating the policy command and the engine command from the control center to an minimum ABAC implementation; communicating a builder response and an engine response from the minimum ABAC implementation to the control center in response to receipt of the policy command and the engine command; communicating the agent command from the control center to a local host system; communicating an agent response from the local host system to the control center in response to receipt of the agent command; and granting or denying access, by the control center, to an administrator based on the builder response, the engine response, and the agent response to manage and enforce the ABAC policy.

BRIEF DESCRIPTION OF THE DRAWINGS

The following descriptions should not be considered limiting in any way. With reference to the accompanying drawings, like elements are numbered alike.

FIG. 5 shows a list of privileges;
FIG. 7 shows an access control list (ACL) for an attribute representation of a resource repository;
FIG. 8 shows an ACL for an attribute representation of a resource repository;
FIG. 9 shows ACLs for two attribute representations of resource repositories;
FIG. 10 shows ACLs for three attribute representations of resource repositories.

DETAILED DESCRIPTION

A detailed description of one or more embodiments is presented herein by way of exemplification and not limitation.

Advantageously and unexpectedly, it has been discovered that an access control system and process centrally manage an attribute-based access control (ABAC) policy and locally compute and enforce decisions over the ABAC policies on resource repositories that are locally protected in a host system using a host access control list (ACL). The access control system and process include expression of an ABAC policy, based in part on an object and an object attribute that conform to access control rules of an enterprise and leverage the ABAC policy expression by introducing representations of local repositories into the access control system and process as objects and object attributes. Repositories can include individual files, directories, or other resources that are subject to protection. The access control system and process maintain a correspondence between the ABAC representations and repositories in local host systems. The access control system and process conduct policy analytics to formulate ACLs for representations in accordance with the ABAC policy and create ACLs on repositories using ACLs of their corresponding representations. As ABAC policy configuration changes, the access control system and process update ACLs on affected representations and automatically update corresponding ACLs on local repositories. Beneficially, a user attempts to access resources in local host systems, and the ABAC policy is enforced in local host systems by managing ACLs by the access control system and process.

Figure 1:
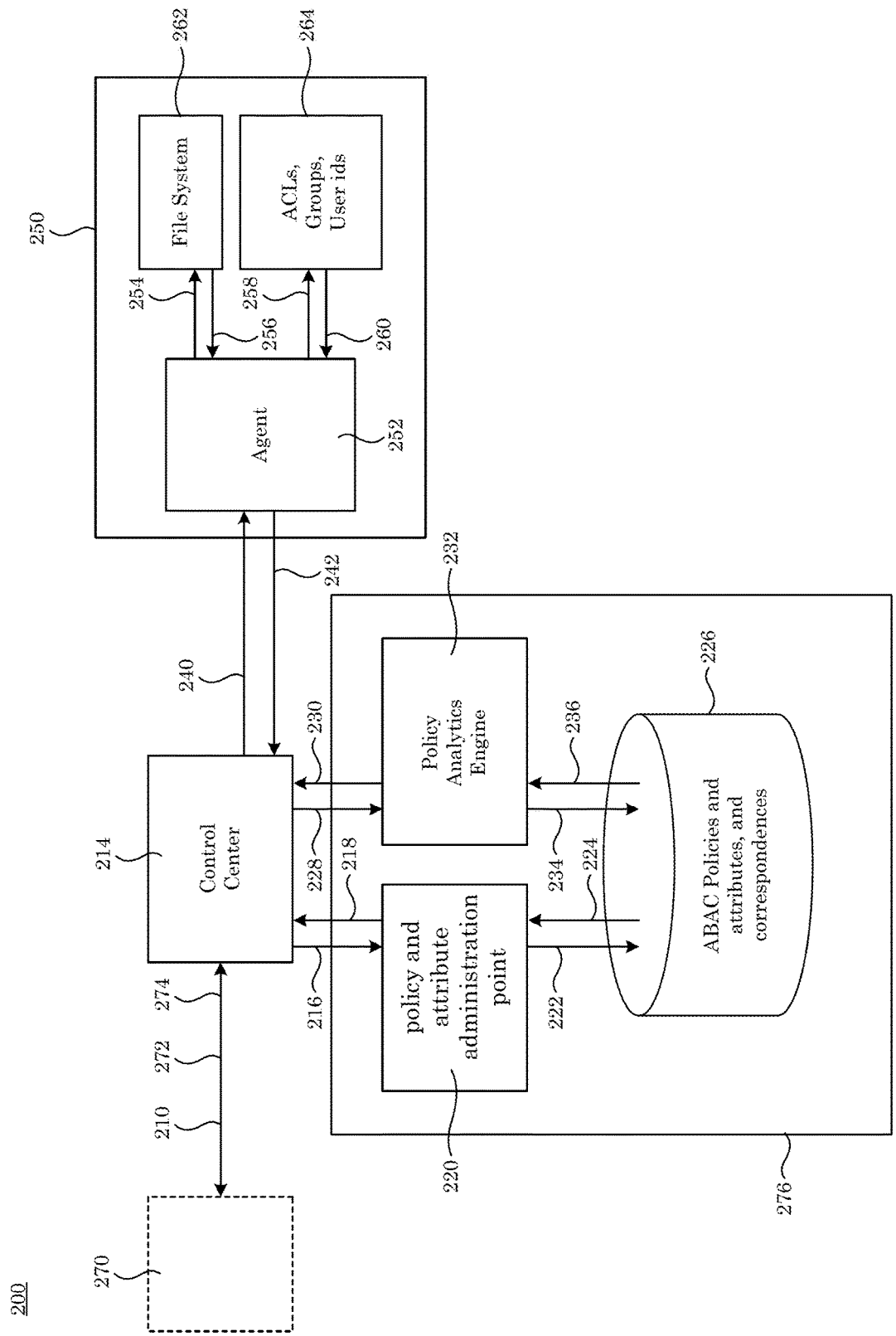
FIG. 1 shows a access control system.

In an embodiment, with reference to FIG. 1, access control system 200 manages and enforces an ABAC policy and includes control center 214. Control center 214 receives administrative command 272, produces policy command 216, produces engine command 228, and produces agent command 240. Access control system 200 also includes minimum ABAC implementation 276 in communication with control center 214. Minimum ABAC implementation 276 includes policy and attribute administration point 220 that receives policy command 216 from control center 214 and produces builder command 222 in response to receipt of policy command 216. Minimum ABAC implementation 276 also includes policy analytics engine 232 that receives engine command 228 from control center 214 and produces analytics command 234 in response to receipt of engine command 228. Policy database 226 of minimum ABAC implementation 276 receives builder command 222 from policy and attribute administration point 220 and receives analytics command 234 from policy analytics engine 232. Access control system 200 also includes local host system 250 in communication with control center 214. Local host system 250 includes agent 252 that receives agent command 240 from control center 214 and produces file command 254 and access command 258 in response to receipt of agent command 240. Local host system 250 also includes file system 262 that receives file command 254 from agent 252 and access control system 264 that receives access command 258 from agent 252.

It is contemplated that administrator 270 communicates administrative command 272 via communication channel 210 to control center 214. Control center 214 provides control center response 274 (e.g., status and resulting information) to administrator 270 in response to administrative command 272. Control center 214 through policy and attribute administration point 220 creates and manages ABAC policies and attributes stored in policy database 226 (e.g., in computer memory, on disk, and the like). Moreover, control center 214 issues policy command 216 to policy and attribute administration point 220 for managing attributes and policies. Policy and attribute administration point 220 implements administrative routines that create and delete information stored in policy database 226. The administrative routines can view or read builder database response 224 that includes database information that can be returned to control center 214 as builder response 218.

Local host system 250 includes file system 262 that can be a repository and include files and directories and access control system 264. Data in access control system 264 can include an access control list (ACL), group, user identity, and the like. Also, local host system 250 includes agent 252 that can include agent software with administrative privileges for identifying and viewing repositories, and creating, deleting, and updating groups, user identities, and ACLs for repositories. Agent 252 translates centralized control center 214 administrative commands (e.g., agent command 240) to native host administrative commands (e.g., file command 254, access command 258, and the like) on local host system 250. Here, control center 214 can apply information contained in builder response 218 and in engine response 230 to formulate agent command 240. Agent 252 translates agent command 240 to native host administrative commands (e.g., file command 254, access command 258, and the like) on local host system 250. Although agent command 240 communicated to agent 252 by control center 214 can be uniform across a plurality of local host systems 250, agent 252 on local host systems 250 can provide functionality (e.g., control and instructions) specific to accommodate ACL semantics of a selected local host system. Agent response 242 to control center 214 can be uniform across the plurality of local host systems 250. File command 254 to file system 262 and access command 258 to access control system 264 can be specific to a selected local host system 250. Moreover, status and data returned as file response 256 to agent 252 from file system 262 and access control system status information returned as access response 260 from access control system 264 can be specific to a selected local host system 250.

Control center 214 through agent 252 identifies repositories for protection in file system 262 and creates a representation of such repository as an object or an object attribute in the ABAC policy stored on policy database using policy and attribute administration point 220 and creates a correspondence between the representation and repository in policy database 226.

Control center 214 through policy analytics engine 232 computes ACLs with select groups for representations in accordance with ABAC policies and attributes stored in policy database 226 and subsequently creates ACLs for corresponding repositories, creates groups, and can create user identities in access control system 264 using agent 252. Further, control center 214 communicates an object or object attribute as engine command 228 to policy analytics engine 232, and policy analytics engine 232 communicates read commands as analytics command 234 to policy database 226. Policy database 226 returns the requested ABAC policy and attribute data as analytics database response 236. Once policy analytics engine 232 computes an ACL with select groups, information as engine response 230 is communicated to control center 214.

Control center 214 through policy and attribute administration point 220 updates ABAC policies or attributes stored in policy database 226 and instructs policy analytics engine 232 to re-compute ACLs and groups for affected representations. Using agent 252, control center 214 updates ACLs for corresponding repositories or groups, and can create or delete user identities in access control system 264.

In an embodiment, policy and attribute administration point 220 and policy analytics engine 232 are modules for control center 214 on a same machine, and policy database 226 can be hosted on that machine. In an embodiment, policy and attribute administration point 220, policy analytics engine 232, and policy database 226 are independent network components.

Figure 2:
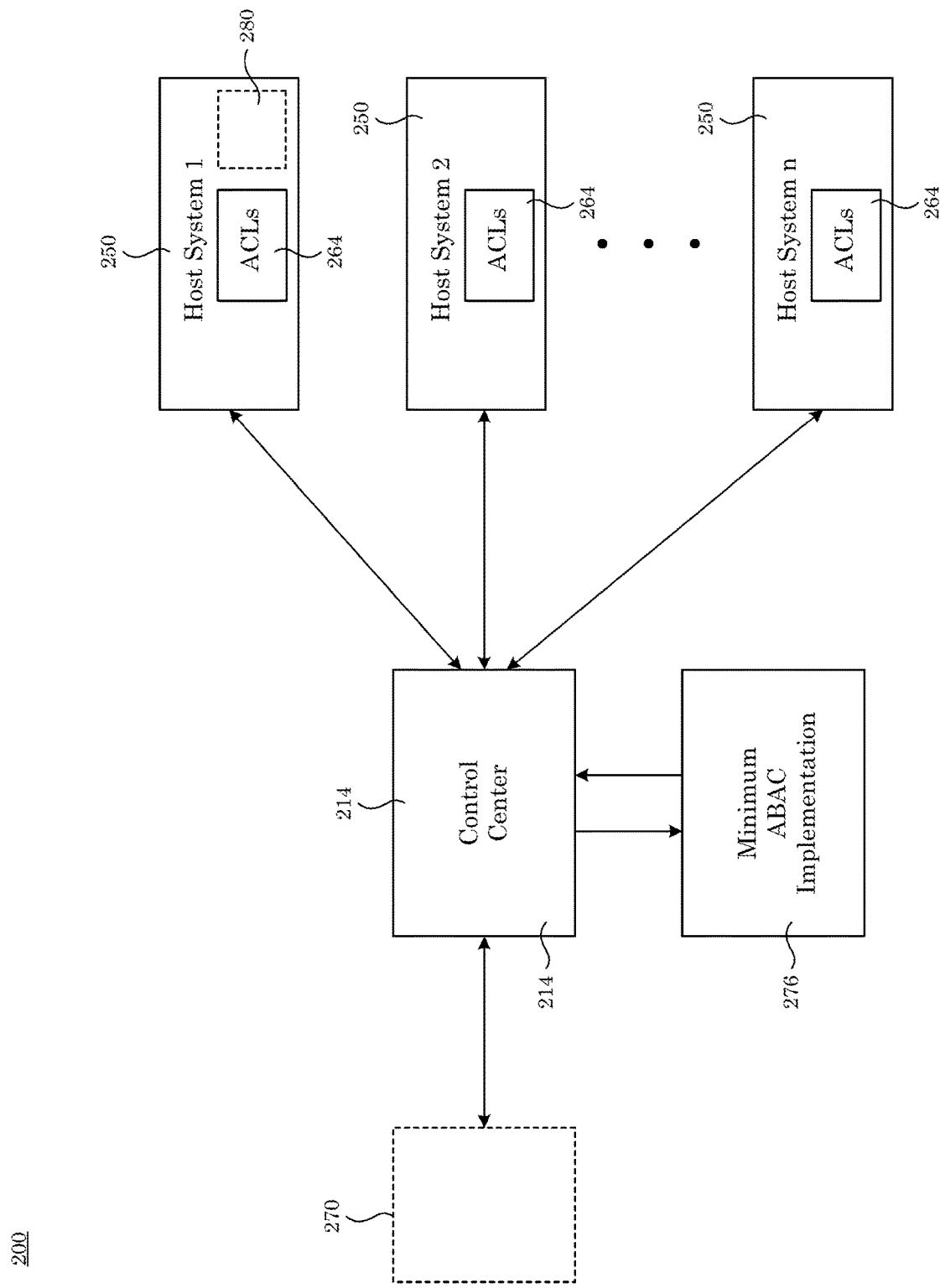
FIG. 2 shows a access control system.

In an embodiment, with reference to FIG. 2, access control system 200 includes a computer application running on behalf of host user 280 in communication with first local host system and a plurality of local host systems 250 in communication with control center 214.

It is contemplated that communication channel 210 can include a transmission medium to communicate an information signal from a sender (e.g., administrator 270) to a receiver (e.g., control center 214) and can be a wired, wireless, or a command-line interface. Moreover, the transmission of information can follow a protocol such as Hypertext Transfer Protocol (HTTP) or command-line interface to cover authentication, error detection and correction, and signaling. In an embodiment, communication channel 210 includes a network cable or successive lines of text.

In access control system 200, control center 214 can include a communication module (e.g., one communication module) to receive commands and return responses from or to administrator 270; a communication module (e.g., three communication modules) to issue commands and receive responses to or from policy and attribute administration point 220, policy analytics engine 232, and agent 252; and a control module to orchestrate administrative functions and that can be a computer application or a webservice. Moreover, control center 214 can send and receive commands and responses to or from policy and attribute administration point 220, policy analytics engine 232, and agent 252 in a synchronous or asynchronous manner. Furthermore, control center 214 should include an authentication module to ensure its authorized use by a privileged administrator and should provide a means of secure communication with agent 252. In an embodiment, control center 214 includes a computer application with an interface to an administrative console, integrated into the minimum ABAC implementation 276, using synchronous communication with other access control system 276 components to avoid race conditions.

In access control system 200, policy command 216 can include a command code and a series of arguments to call the API provided by the policy and attribute administration point 220 and identified by the command code and the arguments provided by the series of arguments and can be a function call or a string of bytes, wherein the command code and arguments are fields separated by a special character. Moreover, a consequence of the API invocation is the visualization, creation, deletion, or modification of a policy element or relation in the policy database 226. In an embodiment, policy command 216 includes a call from control center 214 to a function in policy and attribute administration point 220 when control center 214 is integrated with the policy and attribute administration point 220.

In access control system 200, builder response 218 can include a data, acknowledgement, or error message to visualize the current policy and attribute state and to provide an indication of the success or failure of policy commands 216 and can be a string of bytes, numeric value, or an error code. Moreover, builder response 218 value is the result of the policy and attribute administration point API invoked by the policy command 216. In an embodiment, builder response 218 includes a returned value of an invoked API regardless of whether the control center 214 is integrated with the policy and attribute administration point 220 or not.

In access control system 200, policy and attribute administration point 220 can include administrative routines that, when executed, create and delete information stored in policy database 226 to provide viewing and managing policy database 226 information and can be a computer application or a webservice. Moreover, policy and attribute administration point 220 can be integrated with policy database 226 to optimize performance. In an embodiment, policy and attribute administration point 220 includes an open source implementation of a next generation access control (NGAC) standard—policy administrative point (PAP).

In access control system 200, builder command 222 can manage policy elements and attributes in policy database 226 and can be a SQL statement, Active Directory command, or Neo4j Cypher command. Moreover, builder command 222 provides an administrator with ability for creating, deleting, modifying and viewing ABAC policies and attributes. In an embodiment, builder command 222 includes an off-the-shelf implementation of a subset of the SQL language.

In access control system 200, builder database response 224 can include data, acknowledgement, or error message to visualize the current policy and attribute state and to provide an indication of the success or failure of builder command 222 and can be a string of bytes, numeric value, or an error code. Moreover, builder database response 224 value is the result of builder command 222. In an embodiment, builder database response 224 includes a MySQL query response.

In access control system 200, policy database 226 can include a database to store, to update, and to retrieve ABAC policies and attributes and can be a commercial or open-source database system. Moreover, database 226 can reside on disk or in computer memory. In an embodiment, policy database 226 includes MySQL or Neo4j.

In access control system 200, engine command 228 can include a command code or a series of arguments to call the API provided by policy analytics engine 232 and identified by the command code and the arguments provided by the series of arguments and can be a function call or a string of bytes, wherein the command code and arguments are fields separated by a special character. Moreover, the consequence of the API invocation is the computation of a group of users with common access rights to an ABAC object or object attribute in accordance with an ABAC policy configuration. In an embodiment, engine command 228 includes a call from control center 214 to a function in policy analytics engine 232 when control center 214 is integrated with policy analytics engine 232.

In access control system 200, engine response 230 can include data to identify user groups and ACLs and can be a string of bytes or an error code. Moreover, engine response 230 value is a result of the policy analytics engine API invoked by the engine command 228. In an embodiment, engine response 230 includes the returned value of the invoked API regardless of whether control center 214 is integrated with policy analytics engine 232 or not.

In access control system 200, policy analytics engine 232 can include an algorithm to review policy and to derive user groups and ACLs. Moreover, linear-time algorithms exist to calculate the access rights a user has to objects representing protected resources in NGAC. In an embodiment, policy analytics engine 232 includes an adaptation of the algorithm to identify the access rights a group of users have to protected resources.

In access control system 200, analytics command 234 can extract information in policy database 226 in response to engine command 228 and can be a SQL statement, Active Directory command, or Neo4j Cypher command. Moreover, analytics command 234 issues a parameterized request for information to conduct policy review. In an embodiment, analytics command 234 includes an off-the-shelf implementation of a subset of the SQL language.

In access control system 200, analytics database response 236 can include a data, acknowledgement, or error message to satisfy an analytic command 234 query and can be a string of bytes, numeric value, or an error code. Moreover, analytics database response 236 is a result of analytics command 234. In an embodiment, analytics database response 236 includes a MySQL query response.

In access control system 200, agent command 240 can include instructions from control center 214 to agent 252. Moreover, agent command 240 can pertain to administrative activities on local host system 250. In an embodiment, agent command 240 includes instructions expressed in standardized or ad hoc language for software agents.

In access control system 200, agent response 242 can include agent 252 response to an agent command 240 and can be an acknowledgement or error indicator. Moreover, in case of a success, agent response 242 can include information regarding the state of local host system 250. In case of a failure, agent response 242 can provide information regarding source of the error. In an embodiment, agent response 242 conforms to the same standardized or ad hoc language for software comprising agent 252.

In access control system 200, local host system 250 can include access control system 264 based on ACLs to protect its resource repository maintained in file system 262, and hosting agent 252. Moreover, resources can be files, directories, or other entities that include protection in terms of user accounts, groups, and access rights. Furthermore, local host system 250 includes applications that run on behalf of host user 280 and that issue requests to access resource repositories. In an embodiment, local host system 250 includes an operating system such as the Microsoft Window operating system.

In access control system 200, agent 252 can include software modules to convert agent commands 240 to host system 250 file commands 254 and access commands 258 and can be implemented in host system 250. Moreover, instructions to agent 252 are in the form of agent commands 240, and agent 252 implements the language of agent command 240. In an embodiment, agent 252 is an off-the-shelf product.

In access control system 200, file command 254 can identify and manage file and directory repositories in file system 262 and can be derived from agent command 240 by the agent 252. Moreover, file command 254 executes on host system 250 with administrator privilege and provides an administrator with ability for creating, deleting, modifying and viewing the resource repositories stored in file system 262 of host system 250. In an embodiment, file command 254 includes Windows or Unix-like operating system commands with respect to file system 262.

In access control system 200, file response 256 can include file system 262 response to file command 254 and can be an acknowledgement or an error indicator. Moreover, in case of a success, file response 256 includes information regarding the state of file system 262, or information about the repositories stored in file system 262. In case of a failure, file response 256 provides information regarding source of the error. In an embodiment, file response 256 conforms to standardized output from file system commands for Windows or Unix-like operating system commands regarding file system 262.

In access control system 200, access command 258 performs administrative activities on access control system 264 and can be derived from agent command 240 by agent 252. Moreover, access command 258 executes on host system 250 with administrator privilege and provides an administrator with ability for creating, deleting, updating and viewing the groups, user identities, and ACLs for selected repositories on local host system 250. In an embodiment, access command 256 includes Windows or Unix-like operating system commands with respect to access control system 264.

In access control system 200, access response 260 can include access control system 264 response to access command 258 and can be an acknowledgement or an error indicator. Moreover, in case of a success, access response 260 includes information regarding existing users, groups, or ACLs in access control system 264. In case of a failure, access response 260 includes information regarding source of the failure such as "unknown user," "unknown group," or "invalid ACL format." In an embodiment, access response 260 conforms to standardized output from the access control system commands for Windows or Unix-like operating system commands regarding access control system 264.

In access control system 200, file system 262 includes resource repositories, which can be files or directories and which manages resource repositories. Moreover, file system 262 designates directories or files as protected or no longer protected repositories. In an embodiment, file system 262 includes a preexisting Windows or Unix-like file system.

In access control system 200, access control system 264 includes access control information to express and to enforce user access privileges to protected resource repositories and access control information and can include user accounts, groups of users, access rights, and ACLs. Moreover, access control system 264 attaches ACLs to resource repositories. In an embodiment, access control system 264 includes preexisting Windows or Unix-like access control mechanisms.

In access control system 200, administrator 270 includes a privileged user and an administrative console to submit administrative commands 272 to the control center and receive control center responses 274 and can be an entity such as a human being, computer program, or device. Moreover, administrator 270 is trusted to issue appropriate administrative commands 272 and is authenticated to control center 214. In an embodiment, administrator 270 is a human privileged user.

In access control system 200, administrative command 272 includes an instruction to control center 214 and follows a protocol that prescribes sequencing of commands and responses to commands as well as their format. Moreover, the series of commands starts with establishment of an authenticated session and ends with closing of the session. In an embodiment, administrative command 272 is an HTTP request.

In access control system 200, control center response 274 includes an acknowledgment, information data, or an error indication to support proper management of access control system 200 and can be a message indicating the successful execution of administrative command 272 or the source of an error, or data extracted from policy database 226 or data extracted from local host system 250. Moreover, control center response 274 follows a protocol that prescribes sequencing of commands and responses and their format. In an embodiment, control center response 274 is an HTTP response.

In access control system 200, ABAC policy system 276 includes policy and attribute administration point 220, policy analytics engine 232, and policy database 226 to create and manage ABAC policies to store and to retrieve policy and attribute information, and to compute ACLs for representations of resource repositories. Moreover, ABAC policy system 276 derives ABAC policy compliant ACLs for protection of designated repositories in local host system 250. In an embodiment, ABAC policy system 276 includes a policy administration point, policy information point, and a revised policy analytics engine of Harmonia 1.6 on GitHub.

In access control system 200, host user 280 is a human or device user authenticated to local host system 250 that runs applications and attempts to access resource repositories in local host system 250. Moreover, the identity of the user is included as an element in policy database 226 to access repositories protected by ABAC policy system 276 managed ACLs. In an embodiment, host user 280 is an editor running on behalf of a human user.

In an embodiment, access control system 200 manages and enforces the ABAC policy and includes: minimum ABAC implementation 276 that produces a representation access control list (RACL) in an ABAC policy system; and local host system 250 that produces a resource repository access control list (RRACL) in the local host system such that the RRACL is based on the RACL. It is contemplated that production of the RACL is based on the ABAC policy, and the ABAC policy conforms to NGAC in accordance with the International Committee for Information Technology Standards standard INCITS 525 (December 2017). INCITS 525 is a standard for information technology, particularly NGAC implementation requirements, protocols, and API definitions (referred to therein as NGAC-IRPADS).

In an embodiment, access control system 200 manages and enforces the ABAC policy and include: control center 214 that receives an administrative command, produces a policy command, produces an engine command, and produces an agent command. Access control system 200 also includes minimum ABAC implementation 276 in communication with control center 214. Minimum ABAC implementation 276 includes policy and attribute administration point 220 that receives the policy command from the control center and produces a builder command in response to receipt of the policy command. Access control system 200 also includes a policy analytics engine that receives the engine command from the control center, produces an analytics command in response to receipt of the engine command, and produces a RACL for an object or an object attribute. The object or the object attribute is a representation of and a one-to-one correspondence to a resource repository in a file system on a local host system, wherein the local host system protects the resource repository based on the ACL. Access control system 200 also includes policy database 226 that receives the builder command from the policy and attribute administration point; produces an ABAC attribute, based on the builder command; produces an ABAC policy, based on the builder command and the ABAC attribute; stores the ABAC attribute and the ABAC policy; produces the object that is assigned to the object attribute, based on the builder command; produces a user that is assigned to a user attribute, based on the builder command; receives the analytics command from the policy analytics engine; and reviews the ABAC policy and the ABAC attribute, based on analytics command. Access control system 200 also includes local host system 250 in communication with the control center. Local host system 250 includes an agent, running with administrative privileges, that receives the agent command from the control center; and produces a file command and an access command in response to receipt of the agent command, wherein the file command includes: an instruction to navigate the resource repository on the file system; and an instruction to select the resource repository on the file system to be subject to protection by the local host system, based on the ACL. Local host system 250 also includes the file system that includes the resource repository and that receives the file command. Local host system 250 also includes an access control system that receives the access command from the agent and produces a RRACL based on the RACL, wherein the RRACL includes a group that includes a user.

Access control system 200 has numerous uses, including managing and enforcing the ABAC policy. In an embodiment, a process for managing and enforcing ABAC policy includes: expressing the ABAC policy, wherein the ABAC policy defines privileges of a user, or privileges and prohibitions, of the user using a policy and attribute administration point for configuring authorization data of a centralized ABAC system, the centralized ABAC system defining policies in terms of objects and object attributes; introducing a representation of a resource repository into an expression of the ABAC policy as objects or object attributes, the resource repository to be protected in a local host system that protects data using a RRACL; establishing a one-to-one correspondence between the resource repository and the representation of the resource repository; formulating a RACL for the representation in accordance with the ABAC policy by determining a group of users that can exercise an access right relevant for the representation, the access right comprising read and write; producing a local group on the local host system, the local group comprising a user member; hosting, on the local host system, the resource repository that corresponds to the representation; producing, with agent software, a user account if the user account does not exist for the user member of the local group on the local host system that hosts the resource repository corresponding to the representation; and producing a RRACL on the resource repository corresponding to the representation using the RACL for the representation and agent software.

The process also can include: altering the expression of the ABAC policy using the policy and attribute administration point of the centralized ABAC system; mandating the update of the RACL if the representation is affected by altering the expression of the ABAC policy; and updating, using agent software, a group membership, a user account, and the RRACL on the local host system that has the resource repository that corresponds to the representation that is affected by altering the expression of the ABAC policy.

In an embodiment, a process for managing and enforcing an ABAC policy includes: receiving, by a control center, an administrative command from an administrator; producing, by the control center, a policy command in response to receipt of an administrative command relevant to a policy and attribute administration point; receiving, by the policy and attribute administration point, the policy command from the control center; producing, by the policy and attribute administration point, a builder command in response to receipt of the policy command; receiving, by a policy database, the builder command for configuring the ABAC policy and an ABAC attribute to include creation and deletion of an object attribute and an object assigned to the object attribute in the policy database; producing, by the policy database, a builder database response in response to receipt of the builder command for viewing a current state of the ABAC policy and the ABAC attribute in the policy database; receiving, by the policy and attribute administration point, the builder database response from the policy database; producing, by the policy and attribute administration point, a builder response in response to receipt of the builder database response; communicating the builder response from the policy and attribute administration point to the control center; producing, by the control center, an engine command in response to receipt of an administrative command relevant to the policy analytics engine; receiving, by a policy analytics engine, the engine command from the control center; producing, by the policy analytics engine, an analytics command in response to receipt of the engine command; receiving, by the policy database, the analytics command for review of the ABAC policy and the ABAC attribute for determining an ACL for the object or the object attribute that represents and corresponds to a resource repository in a local host system that protects the resource repository using a RRACL; producing, by the policy database, an analytics database response in response to receipt of the analytics command, the analytics database response comprising a resource access control list (RACL); receiving, by the policy analytics engine, the analytics database response from the policy database; producing, by the policy analytics engine, an engine response in response to receipt of the analytics database response; communicating the engine response from the policy analytics engine to the control center; receiving, by an agent on the local host system, the agent command; producing, by the agent, a file command in response to receipt of the agent command relevant to the file system on the local host system; receiving, by a file system, the file command from the agent for viewing the resource repository and identifying the resource repository on the file system for protection; producing, by the file system, a file response in response to receipt of the file command; producing, by the agent, an access command in response to receipt of the agent command relevant to access control system on the local host system; receiving, by an access control system, the access command from the agent; producing, by the access control system, an access response in response to receipt of the access command; producing, by the agent, an agent response in response to receipt of the file response or the access response; and communicating the agent response from the agent to the control center to manage and enforce the ABAC policy.

In an embodiment, a process for managing and enforcing an ABAC policy includes: receiving, by a control center, an administrative command from an administrator; producing, by the control center, a policy command, an engine command, and an agent command in response to receipt of the administrative command; communicating the policy command and the engine command from the control center to an minimum ABAC implementation; communicating a builder response and an engine response from the minimum ABAC implementation to the control center in response to receipt of the policy command and the engine command; communicating the agent command from the control center to a local host system; communicating an agent response from the local host system to the control center in response to receipt of the agent command; and; granting or denying access, by the control center, to an administrator based on the builder response, the engine response, and the agent response to manage and enforce the ABAC policy. The process also can include: receiving, by a policy and attribute administration point, the policy command from the control center; producing, by the policy and attribute administration point, a builder command in response to receipt of the policy command; receiving, by a policy database, the builder command; producing, by the policy database, a builder database response in response to receipt of the builder command; receiving, by the policy and attribute administration point, the builder database response from the policy database; producing, by the policy and attribute administration point, the builder response in response to receipt of the builder database response; and communicating the builder response from the policy and attribute administration point to the control center. The process also can include: receiving, by a policy analytics engine, the engine command from the control center; producing, by the policy analytics engine, an analytics command in response to receipt of the engine command; receiving, by a policy database, the analytics command; producing, by the policy database, an analytics database response in response to receipt of the analytics command; receiving, by the policy analytics engine, the analytics database response from the policy database; producing, by the policy analytics engine, the engine response in response to receipt of the analytics database response; and communicating the engine response from the policy and attribute administration point to the control center. The process also can include: receiving, by an agent of the local host system, the agent command; producing, by the agent, a file command in response to receipt of the agent command; and receiving, by a file system, the file command from the agent; and producing, by the file system, a file response in response to receipt of the file command. The process also can include producing, by the agent, an access command in response to receipt of the agent command; receiving, by an access control system, the access command from the agent; and producing, by the access control system, an access response in response to receipt of the access command. The process also can include: producing, by the agent, the agent response in response to receipt of the file response or the access response; and communicating the agent response from the agent to the control center. The process also can include communicating a control center response from the control center to the administrator in response to receipt, by the control center, of the builder response, the engine response, the agent response, or a combination comprising at least one of the foregoing responses.

In an embodiment, a process for managing knowledge includes receiving, by control center 214, administrative command 272 from administrator 270; producing, by control center 214, policy command 216, engine command 228, and agent command 240 in response to receipt of administrative command 272; communicating policy command 216 and engine command 228 from control center 214 to minimum ABAC implementation 276; communicating builder response 218 and engine response 230 from minimum ABAC implementation 276 to control center 214 in response to receipt of policy command 216 and engine command 228; communicating agent command 240 from control center 214 to local host system 250; communicating agent response 242 from local host system 250 to control center 214 in response to receipt of agent command 240; and granting or denying access, by host system 250, to the access requests of applications running on behalf of host user 280 based on builder response 218, engine response 230, and agent response 242 to manage and enforce the ABAC policy.

The process for managing and enforcing the ABAC policy also can include receiving, by policy and attribute administration point 220, policy command 216 from control center 214; producing, by policy and attribute administration point 220, builder command 222 in response to receipt of policy command 216; receiving, by policy database 226, builder command 222; producing, by policy database 226, builder database response 224 in response to receipt of builder command 222; receiving, by policy and attribute administration point 220, builder database response 224 from policy database 226; producing, by policy and attribute administration point 220, builder response 218 in response to receipt of builder database response 224; and communicating builder response 218 from policy and attribute administration point 220 to control center 214.

The process for managing and enforcing the ABAC policy also can include receiving, by policy analytics engine 232, engine command 228 from control center 214; producing, by policy analytics engine 232, analytics command 234 in response to receipt of engine command 228; receiving, by policy database 226, analytics command 234; producing, by policy database 226, analytics database response 236 in response to receipt of analytics command 234; receiving, by policy analytics engine 232, analytics database response 236 from policy database 226; producing, by policy analytics engine 232, engine response 230 in response to receipt of analytics database response 236; and communicating engine response 230 from policy analytics engine 232 to control center 214.

The process for managing and enforcing the ABAC policy also can include: receiving, by agent 252 of local host system 250, agent command 240; producing, by agent 252, file command 254 in response to receipt of agent command 240; receiving, by file system 262, file command 254 from agent 252; and producing, by file system 262, file response 256 in response to receipt of file command 254.

The process for managing and enforcing the ABAC policy also can include producing, by agent 252, access command 258 in response to receipt of agent command 240; receiving, by access control system 264, access command 258 from agent 252; and producing, by access control system 264, access response 260 in response to receipt of access command 258.

The process for managing and enforcing the ABAC policy also can include producing, by agent 252, agent response 242 in response to receipt of file response 256 or access response 260; and communicating agent response 242 from agent 252 to control center 214.

The process for managing and enforcing the ABAC policy also can include communicating control center response 274 from control center 214 to administrator 270 in response to receipt, by control center 214, of builder response 218, engine response 230, agent response 242, or a combination thereof.

According to an embodiment, a process for managing and enforcing the ABAC policy includes: receiving, by control center 214, administrative command 272 from administrator 270; producing, by control center 214, policy command 216 in response to receipt of administrative command 272; receiving, by policy and attribute administration point 220, policy command 216 from control center 214; producing, by policy and attribute administration point 220, builder command 222 in response to receipt of policy command 216; receiving, by policy database 226, builder command 222; producing, by policy database 226, builder database response 224 in response to receipt of builder command 222; receiving, by policy and attribute administration point 220, builder database response 224 from policy database 226; producing, by policy and attribute administration point 220, builder response 218 in response to receipt of builder database response 224; communicating builder response 218 from policy and attribute administration point 220 to control center 214; producing, by control center 214, engine command 228 in response to receipt of administrative command 272; receiving, by policy analytics engine 232, engine command 228 from control center 214; producing, by policy analytics engine 232, analytics command 234 in response to receipt of engine command 228; receiving, by policy database 226, analytics command 234; producing, by policy database 226, analytics database response 236 in response to receipt of analytics command 234; receiving, by policy analytics engine 232, analytics database response 236 from policy database 226; producing, by policy analytics engine 232, engine response 230 in response to receipt of analytics database response 236; communicating engine response 230 from policy analytics engine 232 to control center 214; receiving, by agent 252, agent command 240; producing, by agent 252, file command 254 in response to receipt of agent command 240; receiving, by file system 262, file command 254 from agent 252; producing, by file system 262, file response 256 in response to receipt of file command 254; producing, by agent 252, access command 258 in response to receipt of agent command 240; receiving, by access control system 264, access command 258 from agent 252; producing, by access control system 264, access response 260 in response to receipt of access command 258; producing, by agent 252, an agent response 242 in response to receipt of file response 256 or access response 260; and communicating agent response 242 from agent 252 to control center 214 to manage and enforce the ABAC policy.

In the process for managing and enforcing the ABAC policy, receiving, by control center 214, administrative command 272 from administrator 270 includes manually writing commands using an administrative console or instructing the control center 214 to read administrative commands 272 from a batch file.

In the process for managing and enforcing the ABAC policy, producing, by control center 214, policy command 216 in response to receipt of administrative command 272 includes interpreting administrative command 272 for relevance to the policy and attribute administration point 220 and, if relevant, control center 214 produces policy command 216 that can be identical to or closely resembles the original administrative command 272. In an embodiment, from the administrative command "create user Bob as doctor," control center 214 produces policy command 216 as "create user Bob as doctor."

In the process for managing and enforcing the ABAC policy, receiving, by policy and attribute administration point 220, policy command 216 from control center 214 includes an API in the policy and attribute administration point for each type policy command. In an embodiment, the API createUser (userID, userAttribute) performs the action indicated by the policy command "create user <userID> as <userAttribute>, where <userID> can be Bob, Alice, etc., and <userAttribute> can be doctor, teller, etc. When control center 214 and policy and attribute administration point 220 are integrated in a single component, control center 214 issues a call to the API in policy and attribute administration point 220 that corresponds to policy command 216 produced by control center 214. When control center 214 and policy and attribute administration point 220 are not integrated in a single component, policy command 216 is passed through the network to policy and attribute administration point 220 that has a dispatcher that monitors incoming policy commands 216 and calls the appropriate API with arguments extracted from the policy command.

In the process for managing and enforcing the ABAC policy, producing, by policy and attribute administration point 220, builder command 222 in response to receipt of policy command 216 includes translating policy command 216 in instructions in a language of policy database 226. Translation can include execution of parameterized administrative routines that produce database instructions for configuration of policy elements and attribute relations. The set of administrative routines implemented in policy and attribute administration point 220 are sufficient in the expression of ABAC policies in terms of users, user attributes, objects, and object attributes.

In the process for managing and enforcing the ABAC policy, receiving, by policy database 226, builder command 222 includes, in the case that policy and attribute data are stored on disk, policy and attribute administration point 220 sending instructions that include builder command 222 to a database connector. When policy and attribute data are stored in computer memory, policy and attribute administration point 220 sends instructions that include builder command 222 to a set of custom functions that build the in-memory structure.

In the process for managing and enforcing the ABAC policy, producing, by policy database 226, builder database response 224 in response to receipt of builder command 222 includes policy database 226 computing a response to each instruction in builder command 222 using vendor supplied database functions or custom functions used to build the in-memory structure. If an instruction results in an error, an error indicator is returned and processing is stopped, and if all instructions are successful, an acknowledgement is returned, potentially with data.

In the process for managing and enforcing the ABAC policy, receiving, by policy and attribute administration point 220, builder database response 224 from policy database 226 includes returning builder database response 224 as the return values from the database connector or from the custom functions used to build the in-memory structure.

In the process for managing and enforcing the ABAC policy, producing, by policy and attribute administration point 220, builder response 218 in response to receipt of builder database response 224 includes data extracted from the builder database response 224 including an error or success indicator.

In the process for managing and enforcing the ABAC policy, communicating builder response 218 from policy and attribute administration point 220 to control center 214 includes, when control center 214 and policy and attribute administration point 220 are integrated into the same component, returning the values of an API call. When control center 214 and policy and attribute administration point 220 are not integrated into the same component, such communication includes returning the builder response 218 values as a byte string through the network.

In the process for managing and enforcing the ABAC policy, producing, by control center 214, engine command 228 in response to receipt of administrative command 272 includes interpreting administrative command 272 for relevance to policy analytics engine 232 and, if relevant, control center 214 produces engine command 228 that is identical to, or closely resembles, original administrative command 272. Furthermore, engine command 228 includes a request to policy analytics engine 232 for the computation of the information necessary for the construction of ACLs in terms of ABAC objects or object attributes that represent host repositories.

In the process for managing and enforcing the ABAC policy, receiving, by policy analytics engine 232, engine command 228 from control center 214 includes an API in policy analytics engine 232 for each type of engine command 218. Engine command 218 can create ACL for an object or object attribute. When control center 214 and policy analytics engine 232 are integrated in a single component, control center 214 issues a call to the API in the policy analytics engine 232 that corresponds to engine command 218 produced by the control center 214. When control center 214 and policy analytics engine 232 are not integrated in a single component, engine command 218 is passed through the network to policy analytics engine 232 that has a dispatcher that monitors incoming engine command 218 and calls an appropriate API with arguments extracted from engine command 218.

In the process for managing and enforcing the ABAC policy, producing, by policy analytics engine 232, analytics command 234 in response to receipt of engine command 228 includes policy analytics engine 232 parsing engine command 228 determining the type of administrative reviews that satisfies the request included in engine command 228, and generate analytics commands 234 to perform administrative review.

In the process for managing and enforcing the ABAC policy, receiving, by policy database 226, analytics command 234 includes, when policy and attribute data are stored on disk, policy analytics engine 232 sends the requests that include analytics command 234 to a database connector. When policy and attribute data are stored in computer memory, policy analytics engine 232 sends the instructions included in analytics command 234 to a set of custom functions that retrieve data from the in-memory structure.

In the process for managing and enforcing the ABAC policy, producing, by policy database 226, analytics database response 236 in response to receipt of analytics command 234 includes policy database 226 computing a response to each instruction in analytics command 234 using vendor supplied database functions or custom functions used to retrieve data from the in-memory structure. Furthermore, if an instruction results in an error, an error indicator is returned and processing is stopped, and if all instructions are successful, an acknowledgement is returned with data requested by analytics command 234.

In the process for managing and enforcing the ABAC policy, receiving, by policy analytics engine 232, analytics database response 236 from policy database 226 includes returning analytics database response 236 as the return values from the database connector or from the custom functions used to build the in-memory structure.

In the process for managing and enforcing the ABAC policy, producing, by policy analytics engine 232, engine response 230 in response to receipt of analytics database response 236 includes policy analytics engine 232 building an ACL as requested by engine command 228 from the data provided by analytics database response 236. In an embodiment, in the construction of an ACL, policy analytics engine 232 requests a group of users that have read access to objects in an object attribute, oa as an analytics command 234. Analytics database response 236 returns the group, gr of users that meet the criterion. Policy analytics engine 232 receives the response and builds an ACL specifying that group gr has read access on the object attribute oa.

In the process for managing and enforcing the ABAC policy, communicating engine response 230 from policy and attribute administration point 220 to control center 214 includes, when control center 214 and policy analytics engine 232 are integrated into the same component, returning the values of an API call. When control center 214 and policy analytics engine 232 are not integrated into the same component, such communication includes returning engine response 230 values as a byte string through the network.

In an embodiment, in the process for managing and enforcing the ABAC policy, producing, by control center 214, agent command 240 in response to receipt of administrative command 272 includes interpreting administrative command 272 for relevance to agent 252 and if relevant, control center 214 produces agent command 240 to issue instructions to agent 252. Agent command 240 includes instructions to view files system 262, designate repositories that need protection, and create or delete user accounts, groups, and ACLs.

In the process for managing and enforcing the ABAC policy, receiving, by agent 252, agent command 240 includes a communication protocol that is followed by control center 214 to include mutual authentication of control center 214 and agent 252.

In the process for managing and enforcing the ABAC policy, producing, by agent 252, file command 254 in response to receipt of agent command 240 includes examining agent command 240 and, if it is relevant to file system agent 252, producing file command 254 to carry out the instructions included in agent command 240.

In the process for managing and enforcing the ABAC policy, receiving, by file system 262, file command 254 from agent 252; producing, by file system 262, file response 256 in response to receipt of file command 254 includes reading file command 254 by a preexisting command interpreter of the host system performing the actions requested in file command 254 and returning the requested data as file response 256. Furthermore, the returned values may include an error indicator or a success indicator potentially with data. The process provides navigation of the file system and identification and selection of a resource repository.

In the process for managing and enforcing the ABAC policy, producing, by agent 252, access command 258 in response to receipt of agent command 240 includes examining agent command 240 and, if it is relevant to access control system agent 264, producing access command 258 to carry out instructions included in agent command 240. Furthermore, access command 258 is similar, if not identical, to agent command 240 that includes instructions to create or delete user accounts, create or delete or modify groups and ACLs for resource repositories.

In the process for managing and enforcing the ABAC policy, receiving, by access control system 264, access command 258 from agent 252 includes reading access command 258 by a preexisting command interpreter of the host system.

In the process for managing and enforcing the ABAC policy, producing, by access control system 264, access response 260 in response to receipt of access command 258 includes performing actions requested in access command 258, returning in the event of a failure an error indicator and in the event of a success, returning an acknowledgment and potentially access control system state information.

In the process for managing and enforcing the ABAC policy, producing, by agent 252, an agent response 242 in response to receipt of file response 256 or access response 260 includes information similar, if not identical, to file response 256 or access response 260.

In the process for managing and enforcing the ABAC policy, communicating agent response 242 from agent 252 to control center 214 includes returning agent response 242 as specified by the communication protocol followed by control center 214 and agent 252 as a stream of bytes.

In an embodiment, a computer-implemented method includes: receiving, by control center 214, administrative command 272 from administrator 270; producing, by control center 214, policy command 216 in response to receipt of administrative command 272; receiving, by policy and attribute administration point 220, policy command 216 from control center 214; producing, by policy and attribute administration point 220, builder command 222 in response to receipt of policy command 216; receiving, by policy database 226, builder command 222; producing, by policy database 226, builder database response 224 in response to receipt of builder command 222; receiving, by policy and attribute administration point 220, builder database response 224 from policy database 226; producing, by policy and attribute administration point 220, builder response 218 in response to receipt of builder database response 224; communicating builder response 218 from policy and attribute administration point 220 to control center 214; producing, by control center 214, engine command 228 in response to receipt of administrative command 272; receiving, by policy analytics engine 232, engine command 228 from control center 214; producing, by policy analytics engine 232, analytics command 234 in response to receipt of engine command 228; receiving, by policy database 226, analytics command 234; producing, by policy database 226, analytics database response 236 in response to receipt of analytics command 234; receiving, by policy analytics engine 232, analytics database response 236 from policy database 226; producing, by policy analytics engine 232, engine response 230 in response to receipt of analytics database response 236; communicating engine response 230 from policy and attribute administration point 220 to control center 214; receiving, by agent 252, agent command 240; producing, by agent 252, file command 254 in response to receipt of agent command 240; receiving, by file system 262, file command 254 from agent 252; producing, by file system 262, file response 256 in response to receipt of file command 254; producing, by agent 252, access command 258 in response to receipt of agent command 240; receiving, by access control system 264, access command 258 from agent 252; producing, by access control system 264, access response 260 in response to receipt of access command 258; producing, by agent 252, an agent response 242 in response to receipt of file response 256 or access response 260; and communicating agent response 242 from agent 252 to control center 214 to manage and enforce the ABAC policy.

According to an embodiment, a system including one or more computers configured to perform operations, the operations including: receiving, by control center 214, administrative command 272 from administrator 270; producing, by control center 214, policy command 216 in response to receipt of administrative command 272; receiving, by policy and attribute administration point 220, policy command 216 from control center 214; producing, by policy and attribute administration point 220, builder command 222 in response to receipt of policy command 216; receiving, by policy database 226, builder command 222; producing, by policy database 226, builder database response 224 in response to receipt of builder command 222; receiving, by policy and attribute administration point 220, builder database response 224 from policy database 226; producing, by policy and attribute administration point 220, builder response 218 in response to receipt of builder database response 224; communicating builder response 218 from policy and attribute administration point 220 to control center 214; producing, by control center 214, engine command 228 in response to receipt of administrative command 272; receiving, by policy analytics engine 232, engine command 228 from control center 214; producing, by policy analytics engine 232, analytics command 234 in response to receipt of engine command 228; receiving, by policy database 226, analytics command 234; producing, by policy database 226, analytics database response 236 in response to receipt of analytics command 234; receiving, by policy analytics engine 232, analytics database response 236 from policy database 226; producing, by policy analytics engine 232, engine response 230 in response to receipt of analytics database response 236; communicating engine response 230 from policy and attribute administration point 220 to control center 214; receiving, by agent 252, agent command 240; producing, by agent 252, file command 254 in response to receipt of agent command 240; receiving, by file system 262, file command 254 from agent 252; producing, by file system 262, file response 256 in response to receipt of file command 254; producing, by agent 252, access command 258 in response to receipt of agent command 240; receiving, by access control system 264, access command 258 from agent 252; producing, by access control system 264, access response 260 in response to receipt of access command 258; producing, by agent 252, an agent response 242 in response to receipt of file response 256 or access response 260; and communicating agent response 242 from agent 252 to control center 214 to manage and enforce the ABAC policy.

In an embodiment, a computer-readable medium having instructions stored thereon, which, when executed by a processor, cause the processor to perform operations including: receiving, by control center 214, administrative command 272 from administrator 270; producing, by control center 214, policy command 216 in response to receipt of administrative command 272; receiving, by policy and attribute administration point 220, policy command 216 from control center 214; producing, by policy and attribute administration point 220, builder command 222 in response to receipt of policy command 216; receiving, by policy database 226, builder command 222; producing, by policy database 226, builder database response 224 in response to receipt of builder command 222; receiving, by policy and attribute administration point 220, builder database response 224 from policy database 226; producing, by policy and attribute administration point 220, builder response 218 in response to receipt of builder database response 224; communicating builder response 218 from policy and attribute administration point 220 to control center 214; producing, by control center 214, engine command 228 in response to receipt of administrative command 272; receiving, by policy analytics engine 232, engine command 228 from control center 214; producing, by policy analytics engine 232, analytics command 234 in response to receipt of engine command 228; receiving, by policy database 226, analytics command 234; producing, by policy database 226, analytics database response 236 in response to receipt of analytics command 234; receiving, by policy analytics engine 232, analytics database response 236 from policy database 226; producing, by policy analytics engine 232, engine response 230 in response to receipt of analytics database response 236; communicating engine response 230 from policy and attribute administration point 220 to control center 214; receiving, by agent 252, agent command 240; producing, by agent 252, file command 254 in response to receipt of agent command 240; receiving, by file system 262, file command 254 from agent 252; producing, by file system 262, file response 256 in response to receipt of file command 254; producing, by agent 252, access command 258 in response to receipt of agent command 240; receiving, by access control system 264, access command 258 from agent 252; producing, by access control system 264, access response 260 in response to receipt of access command 258; producing, by agent 252, an agent response 242 in response to receipt of file response 256 or access response 260; and communicating agent response 242 from agent 252 to control center 214 to manage and enforce the ABAC policy.

Access control system 200 and processes herein have numerous advantageous and beneficial properties that include leverage of ABAC policy system 276 to provide access control policy support beyond direct management of ACLs. Here, enforced policies can combine privileges of sub-policies (e.g., discretionary access control and role-based access control) and can consider denials for expressing privilege exceptions to sub-policies. By expressing policies in terms of combinations of user attributes in ABAC policy system 276, access control system 200 creates and manages fewer attributes than the number of otherwise required groups by conventional technology. By conducting policy enforcement and decision-making using ACLs, access control system 200 provides enhanced performance in granting or denying user access requests beyond an ABAC system alone. The enhanced performance of access control system 200 is desirable in applications that manually access system resource repositories on an individual basis and is advantageous in big data processing and supercomputing that include batch processing. Although ACLs may not include answering policy review questions, access control system 200 provides a full breadth of policy analytics for ABAC and includes identification of the access capabilities of a user. Moreover, access control system 200 enforces ABAC policies in local host system 250 with minimal or no changes to local host system 250 beyond implementation of agent software.

The articles and processes herein are illustrated further by the following Example, which is non-limiting.

EXAMPLE

System for Centralized ABAC Policy Administration and Local ABAC Policy Decision and Enforcement in Host Systems using Access Control Lists.

A process that centrally manages attribute-based access control (ABAC) policies and locally computes and enforces decisions regarding those policies for protection of resource repositories in host systems using their native ACL mechanisms includes expression of an ABAC policy that conforms to the access control rules of an enterprise and leverages the ABAC policy expression by introducing representations of local host resource repositories into the ABAC policy expression as objects or object attributes. Resource repositories can include individual files, directories, or other system resources that require protection. The process further maintains a correspondence between the ABAC representations and resource repositories in local host systems. The process also leverages an ability to conduct policy analytics to formulate ACLs for those representations in accordance with the ABAC policy and create ACLs on resource repositories using the ACLs of their corresponding representations. As the ABAC policy configuration changes, the process updates the ACLs on affected representations and automatically updates corresponding ACLs on local resource repositories. Operationally, users attempt to access resources in local host systems, and the ABAC policy is enforced in those systems in terms of their native ACLs.

The process enforces ABAC policies in host systems using their ACLs. The process centrally manages ABAC policies using a policy and attribute administration point and a database for storing attributes and policy information in a minimum ABAC implementation.

The minimum ABAC implementation also includes a policy analytics engine that computes ACLs in terms of local host repositories that are represented as ABAC objects or object attributes. As a consequence of the process, ABAC policies are enforced over user access requests to resource repositories in local host systems in terms of their ACLs.

An ACL is a mechanism that protects resource repositories of varying types (e.g., files and directories). Each resource repository is associated with an ACL that stores the users and their approved access rights for the resource repository. The list is checked by the access control system to determine if access is granted or denied. Lists are not excessively long if groups of users with common access rights to the resource repository (rather than individual members) are attached.

An advantage of ACL mechanisms is ACLs are extremely efficient when computing access decisions and help simplify the review of users' access rights to a repository. Another advantage is ACLs allow access to a resource repository to be easily revoked by simply deleting an ACL entry, or deleting a user or group membership of an ACL entry. However, because ACLs make it difficult to determine the access rights users have to resource repositories, ACLs are cumbersome when managing access capabilities of users, the process herein overcomes these aspects.

ABAC provides authorization logic and is an access control process wherein user requests to perform operations on resources are granted or denied based on the assigned attributes of the user, the assigned attributes of the resource, and a set of policies that are specified in terms of those attributes.

ABAC manages policy. When a user enters on duty or when a user's job function, authority, affiliations, or other user characteristic changes, an administrator assigns or reassigns the user to the appropriate attributes, and the user automatically gains appropriate access capabilities to system resources. Similarly, when a resource is created or different accesses to a resource are involved, appropriate object attribute assignments are created or deleted, automatically providing policy-preserving user access rights to the resource.

ABAC implementations conventionally include four functional layers working together for policy-preserving access control that include enforcement, decision, access control data, and administration. Among these components is a policy enforcement point (PEP) that traps access requests and enforces policy. To determine whether to grant or deny access, the PEP submits the request to a policy decision point (PDP). The PDP computes and returns a decision to the PEP based on policy and attribute information stored in one or more databases. Information is managed in the policy and attribute stores through an ABAC system administrative API.

Two standards address ABAC features and include extensible access control markup language (XACML) and NGAC. NGAC is described in ANSI INCITS 525 (December 2017), ANSI INCITS 499 (2013) and ANSI INCITS 526 (2016). For both standards, there exist open-source and commercial implementations. While these implementations deliver ABAC's administrative advantages, not all ABAC implementations enable efficient policy analytics involving the ability to answer questions regarding access state and that leverage that ability to generate different access control representations to include an ACL representation.

By leveraging an ABAC implementation, the process provides access control policy support beyond what is feasible through direct management of ACLs. For instance, enforced policies may combine privileges of sub-policies (e.g., discretionary access control and role-based access control) and may consider denials for expressing privilege exceptions to sub-policies. By expressing policies in terms of combinations of user attributes, the process includes creation and management of fewer groups than the number otherwise used in direct ACL implementations. By conducting policy enforcement and decision-making using ACLs, the process provides enhanced performance in granting or denying user access requests beyond using an ABAC system alone. This enhanced performance is desirable in applications that manually access system resources on an individual basis and in such environments as big data processing and supercomputing that involve batch processing. Although ACLs preclude the ability to answer policy review questions, the process provides policy analytics permissible to ABAC including identification of access capabilities of a user. The process also enforces ABAC policies in local host systems with minimal or no changes to those systems beyond implementation of agent software.

Regarding a minimum ABAC, the process of central management of ABAC policies and local enforcement of those ABAC policies through ACLs on local host repositories is dependent on an efficient means of conducting policy analytics in an ABAC system. Determining what group of users can access a resource with an access right (e.g., read or write) is included in the process. An open source implementation, Harmonia 1.6, is an NGAC reference implementation on GitHub that exemplifies an ABAC implementation with the capability to efficiently conduct policy analytics, wherein Annex A of ANSI INCITS 525 (December 2017) describes a linear-time algorithm to calculate the access rights a user has to objects representing protected resources based on certain data. The algorithm can be adapted to make other policy determinations such as identifying the access rights a group of users have to protected resources in determining ACLs.

Although a PEP and PDP can be included in an ABAC implementation, the process does not need to include these components since enforcing ABAC policy and computing decisions are achieved by the local host's native ACL mechanism. In addition to conducting policy analytics, the ABAC system administers and stores policies and attributes, through a policy and attribute administration point although standard XACML dataflow model does not include management of its attributes.

The process for centralized ABAC policy management and local host enforcement of ABAC policies uses native host ACLs and includes: expressing an ABAC policy that defines privileges, or privileges and prohibitions, of users using a policy and attribute administration point for configuring the authorization data of a centralized ABAC system that, in part, defines policies in terms of objects and object attributes; introducing representations of resource repositories needing protection in local systems that protect their data using ACLs into the ABAC policy expression as objects or object attributes; establishing a one-to-one correspondence between the representations of resource repositories and actual resource repositories; formulating ACLs for representations in accordance with the ABAC policy by determining the group of users that can exercise the access right for each access right (e.g., read, write) relevant for a representation r; creating a group on the local system with user members for each determined group and hosting the resource repository corresponding to representation r, using agent software; creating a user account, if one does not yet exist, for each user member of each created group on the local system hosting the resource repository corresponding to representation r, using agent software; creating an ACL on the resource repository corresponding to representation r, using the ACL formulated for representation r and agent software; optionally altering the expression of ABAC policy using the policy and attribute administration point of the centralized ABAC system and mandating the update of ACLs of each representation affected by the alteration; and updating group memberships, user accounts, and ACLs on local systems with resource repositories that correspond to affected representations using agent software.

FIG. 1 shows control center 214 in communication with administrator 270, minimum ABAC implementation 270 (also referred herein as minimum ABAC implementation, and local host system 250.

Administrators express ABAC policies, introduce representations of local repositories into the policy expression, and instruct the creation of ACLs for representations of resource repositories and use those ACLs for creation of ACLs for repositories on local host systems. To accomplish these functions, administrators use administrative commands through calls to the API of the control center. The control center provides status and resulting information in reply to administrative commands. The minimum ABAC implementation includes a policy and attribute administration point, a policy analytics engine, and a database for storing ABAC policies and attributes. In addition, the process can store correspondences between resource repositories and their representations (e.g., an object or object attribute) in the database.

The control center, through the policy and attribute administration point, creates and manages ABAC policies and attributes that are stored in computer memory or on disk, referred to here as the database. The control center issues commands to the policy and attribute administration point for managing attributes and policies. The policy and attribute administration point implement administrative routines that, when executed, create and delete information stored in the database. These administrative routines may pertain to viewing or reading database information, the results of which would be returned to the control center.

The host system implements a file system that includes repositories of files and directories and a native access control system with data comprising ACLs, groups, and user identities. In addition to these components, the process implements agent software on the host system with administrative privileges for identifying and viewing resource repositories and creating, deleting, and updating groups, user identities, and ACLs for resource repositories. The agent software translates centralized control center administrative commands to native host administrative commands. Although the commands issued to agent software by the control center may be uniform across a variety of host systems, agent software on host systems are specific to the ACL, group, and user semantics of a host. Agent software response to the control center can be uniform across host systems. Agent commands to the file system and commands to the host access control system are host-specific. Similarly, status and data returned to the agent from the file system and access control system status information returned to the agent also are host-specific.

The control center, through agent software identifies repositories requiring protection in the file system, creates a representation of each such repository as either an object or an object attribute in the ABAC policy using the policy and attribute administration point, and creates a correspondence between the representation and repository in the database.

The control center, through the policy analytics engine, computes ACLs with required groups for representations in accordance with ABAC policies and attributes stored in the database and subsequently creates ACLs for corresponding repositories, creates groups, and, optionally, creates user identities in the host access control system using host agent software. To complete this function, the control center passes a representation of a resource repository (an object or object attribute) to the policy analytics engine, which then issues read commands to the database resulting in the returns of requested ABAC policy and attribute data. Once the policy analytics engine computes an ACL with required groups, that information is passed back to the control center.

After the control center updates ABAC policies or attributes stored in the database, the control center instructs the policy analytics engine to re-compute ACLs and groups for affected representations. The policy/attribute update and the ACL re-compute operations can be one transaction to avoid semantic discrepancy between policy/attribute data store and ACL representations. Using agent software, ACLs are updated for corresponding resource repositories or groups. The agent software can create or delete user identities in the host access control system.

The policy and attribute administration point and policy analytics engine can be modules of the control center on the same machine. The database could be hosted on that machine, or these components could reside as independent network components. Although described as a single store, attributes and policies can physically reside in different stores. When the process provides ABAC support to a single host system, the control center, the entire minimum ABAC implementation, and the agent could reside on that host system.

Figure 3:
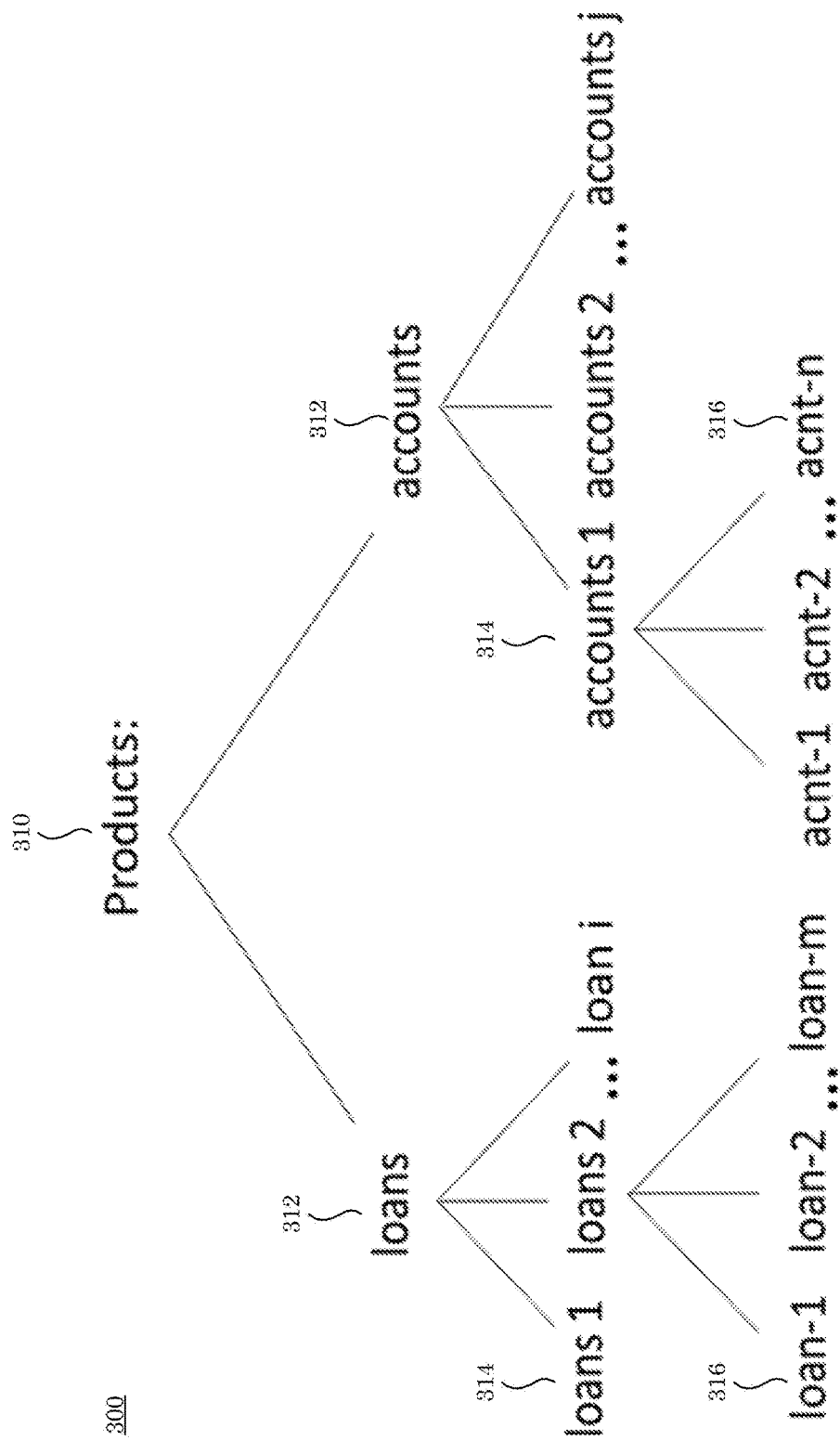
FIG. 3 shows a directory structure.

FIG. 3 shows a directory structure of a file system on a host system owned by a bank that is an exemplary use case to illustrate the process. The structure includes a root directory ("Products") with two subdirectories ("loans" and "accounts"), each with subdirectories (e.g., loans 2 and accounts 1) for storing and organizing loan and account products as files and with respect to the branches of the bank. For instance, loans 2 maintains loan files belonging to branch 2.

Although ACL features for protecting resource repositories can vary from system to system and different terminology is sometimes used to express the same feature, we identify semantics common to many ACL mechanisms.

ACLs on directories are treated differently than ACLs on files. Read on a directory implies the right to list children of the directory. Write on a directory implies the right to create or delete children of the directory. Read and write on a file implies the same right. ACLs on a directory or file can inherit or block ACLs of parent directories. ACL semantics listed here with the directory structure shown in FIG. 3 form part of this illustrative example.

Figure 4:
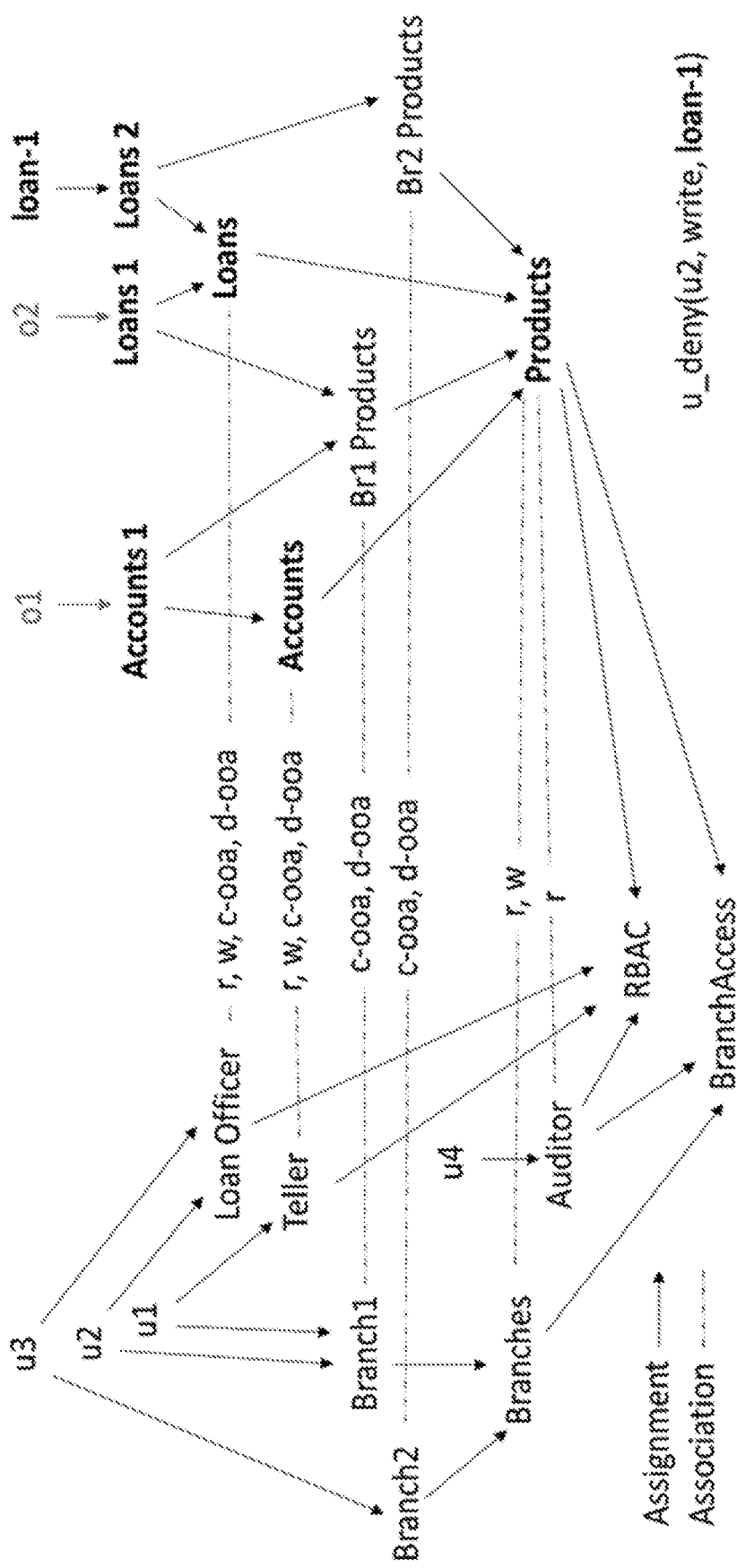
FIG. 4 shows a policy configuration.

With regard to an ABAC policy expression, the process begins with the creation of an ABAC policy using the policy and attribute administration point of an ABAC implementation. FIG. 4 shows an exemplary ABAC bank policy in terms of NGAC policy elements and relations wherein users (e.g., u1, u2) and user attributes (e.g., Teller, Branch 1) are shown on the left side of FIG. 4, and object attributes (e.g., Accounts 1 and Loans) and objects (e.g., loan-1, o2) are on the right side of FIG. 4. Arrows indicate assignments and imply a containment relation (e.g., loan-1 is contained in loans 2, Loans, Br2 Products, Products, and RBAC). The policy takes into consideration two sub-policies referred to by NGAC as policy classes: RBAC and BranchAccess.

Access rights to perform operations are acquired through associations. The dashed lines illustrate association relations. Here, ua-ars-oa is an association, wherein ua is a user attribute, ars is a set of resource or administrative access rights, and oa is an object attribute. The ars depicted in FIG. 4, pertain to both resource access rights and administrative access rights. The r and w are read and write, resource access rights, and c-ooa and d-ooa are administrative access rights for "creating an object in object attribute" and "deleting an object in object attribute." The association ua-ars-oa means that the users contained in ua can execute the access rights in ars on the policy elements referenced by oa. The set of policy elements referenced by oa is dependent on and meaningful to the access rights in ars. For instance, the association Loan Officer—{r, w, c-ooa, d-ooa}—Loans pertains to capabilities to read and write objects (representing files) contained in Loans (i.e., o2 and loan-1) and create and delete object assignments (a type of relation) in Loans, Loans 1, and Loans 2.

Collectively, associations and assignments indirectly specify privileges with respect to policy classes of the form (u, ar, e), with the meaning that user u is permitted to execute or can execute the access right ar on element e, where e can represent an object attribute or object.

NGAC includes an algorithm for determining privileges with respect to a policy class and association. Specifically, (u, ar, e) is a privilege if and only if, for each policy class pc in which e is contained, the following is true: user u is contained by the user attribute of an association; element e is contained by attribute at of that association; attribute at of that association is contained by policy class pc; and access right ar is a member of the access right set of that association.

FIG. 5 lists derived privileges for the policy configuration depicted in FIG. 4.

In addition to assignments and associations, NGAC includes prohibitions or deny relations. In general, deny relations specify privilege exceptions. Among these prohibitions is a user-based deny, denote by, u_deny(u, ars, pe), where u is a user, ars is an access right set, and pe is a policy element used as a reference for itself and the policy elements contained by the policy element. The meaning is that user u cannot execute access rights in ars on policy elements in pe. User-deny relations can be created by an administrator. An administrator, for example, might impose a condition wherein no user is able to alter their own loan file, even if the user is assigned to Loan Officer with capabilities to read or to write all Loans. The u-deny relation depicted in FIG. 4, prohibits u2 from writing to loan-1. This privilege exception is reflected in FIG. 5 using as the sixth element, i.e., (u2, w, loan-1).

A natural language description of the policy expressed by FIG. 4 is as follows: Tellers can read and write accounts objects in all branches; tellers can create and delete accounts objects in the branches for which they are assigned; Loan Officers can read and write loans objects in all branches; user u3 (a Loan Officer) cannot write to loan-1; Loan Officers can create and delete loans objects in the branches to which they are assigned; and an auditor can read account and loan products in all branches.

With regard to creating ACLs for representations, the process leverages an ABAC policy expression by introducing representations of host repositories as either an object attribute in the case of a directory or an object in the case of a file. The process further maintains a correspondence between the ABAC representations of the repository and the actual repository in host systems. In FIG. 4, Accounts 1, Loans 1, Loans 2, Accounts, Loans, Products, and loan-1 are in bold face type to indicate that they represent host system repositories in the directory structure depicted in FIG. 3.

Figure 6:
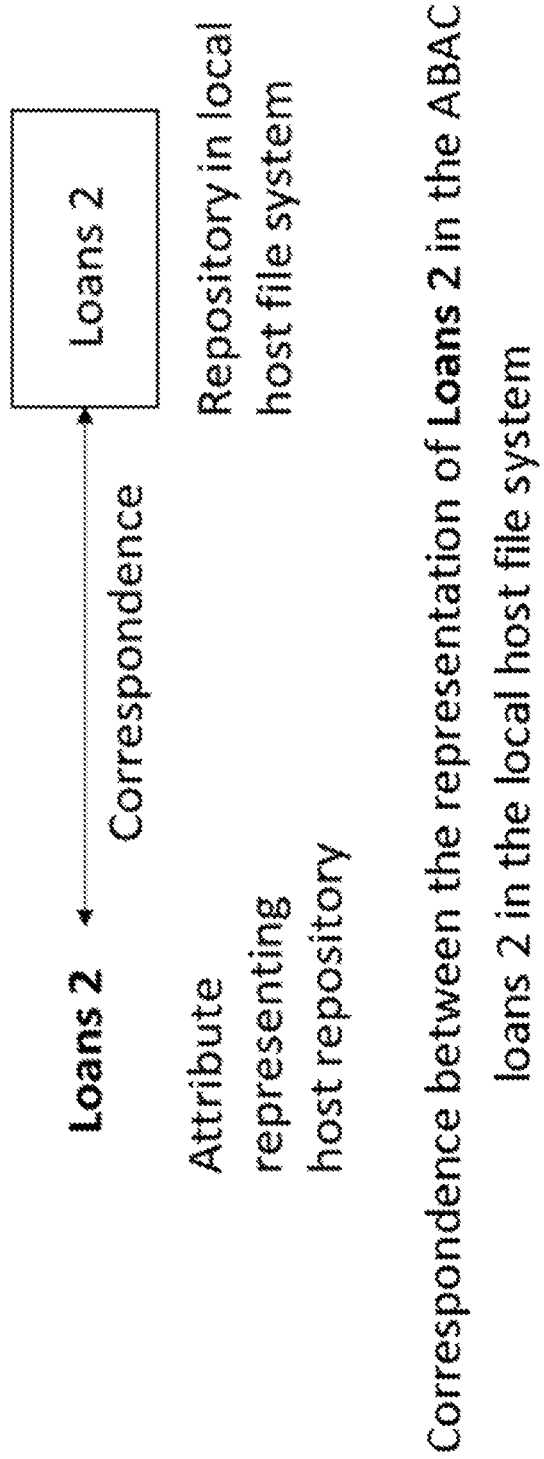
FIG. 6 shows a correspondence between a resource repository and a representation.

FIG. 6 illustrates an establishment of a correspondence between Loans 2 in the ABAC configuration and loans 2 in the directory structure of the local host file system.

Once a representation has been established, the process conducts a policy review in such a way as to formulate an ACL for the representation in accordance with the ABAC policy. A central aspect of the policy review involves determining the group of users who can perform specific operations (e.g., read and write) on the representation or on an object contained in the representation. Since the meaning of an ACL differs for directories and files, the logic of the policy analytics engine can distinguish between representations of files, directories containing files, and directories that do not contain files. Here, the policy analytics engine makes this distinction. In describing a logic of the policy analytics engine, we refer to a "custom" ACL to indicate blocking of ACL privilege inheritance of parent directories.

Let us consider loan-1, a representation of the file loan-1. To read loan-1 a user is assigned to Loan Officer or Auditor. The group of users that meet this criterion are u2, u3, and u4. To write loan-1 a user is assigned to Loan Officer. The group of users that meet this criterion are u2 and u3. However, in accordance with the overall policy, u2 is denied the ability to write to loan-1, and, as such, user u2 is not included in the group for writing. Any convention can be used for naming groups. In this example, gr1 is used for the group that can read, and gr2 is used for the group that can write to loan-1 in deriving an ACL for loan-1 as shown in FIG. 7.

The ACL is designated as "custom" to indicate that it does not inherit access rights from its parent directory (loans 2). In the case of a representation of a directory containing files, the logic creates a custom ACL for the directory and an ACL for inheritance by the files (the directory's children). While establishing correspondence with a directory repository that contains files, the logic also creates an arbitrary-unique object and assigns that object to the repositories representation if no object is currently assigned to the representation. The object (o1 and o2) to object-attribute assignments in FIG. 4 illustrates such an assignment. To read an object in Loans 2 under the policy of FIG. 4, a user is assigned to Loan Officer or Auditor. The group of users that meet this criterion is referred to as gr3. To write to an object in Loans 2, a user is assigned to Loan Officer. This group of users are referred to as gr4. Certain groups can list and create or delete children of Loans 2.

A user needs to have permissions to list children for all directories along the path to a file for which they have read access. In the case of a representation of a directory of any type, this group corresponds to users with read access to an object contained in the representation. For Loans 2, that is gr3.

With regard to the group of users that can create or delete children, this group of users correspond to the users that can create or delete objects in Loans 2. In accordance with the policy, these users are assigned to both Loan Officer and Branch 2, namely u3. Given that read on a directory implies list and write on a directory implies create or delete children, the ACL shown in FIG. 8 is made for Loans 2.

Because file level permissions apply to children (files) of the directory, ACL file inheritance is specified. Again, due to its designation as "custom," this ACL file inheritance is blocked for loan-1, enabling the preservation of u2's denial to write to loan-1. Using the same approach used for Loans 2, an ACL can be created for Loans 1 and Accounts 1 that also contain files as shown in FIG. 9.

With regard to representations of directory repositories that do not contain files, for these representations, a read (list) ACL is required. Given a user needs to have permissions to list children for all directories along the path to a file for which they have read access, the policy analytic engine could simply identify the users who can read an object contained in the representation. Applying this approach to Loans, Accounts, and Products, their ACLs are formulated and are shown in FIG. 10.

Figure 11:
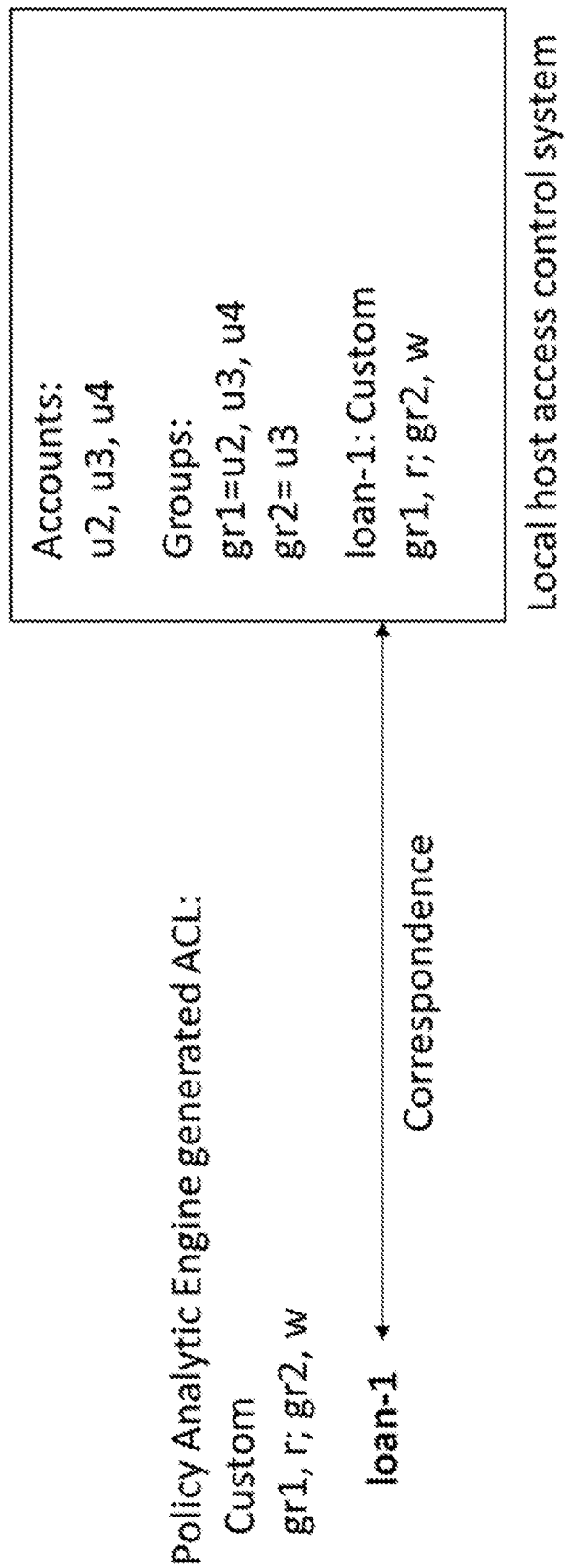
FIG. 11 shows creation of an ACL with associated groups and user accounts in a local host access control system.

With regard to creating host access control data, the process further creates a corresponding group as well as a user account and an ACL on the local host repositories using the computed group and the ACL of the corresponding representation. FIG. 11 shows creation of such access control information on a local host system regarding loan-1.

Figure 12:
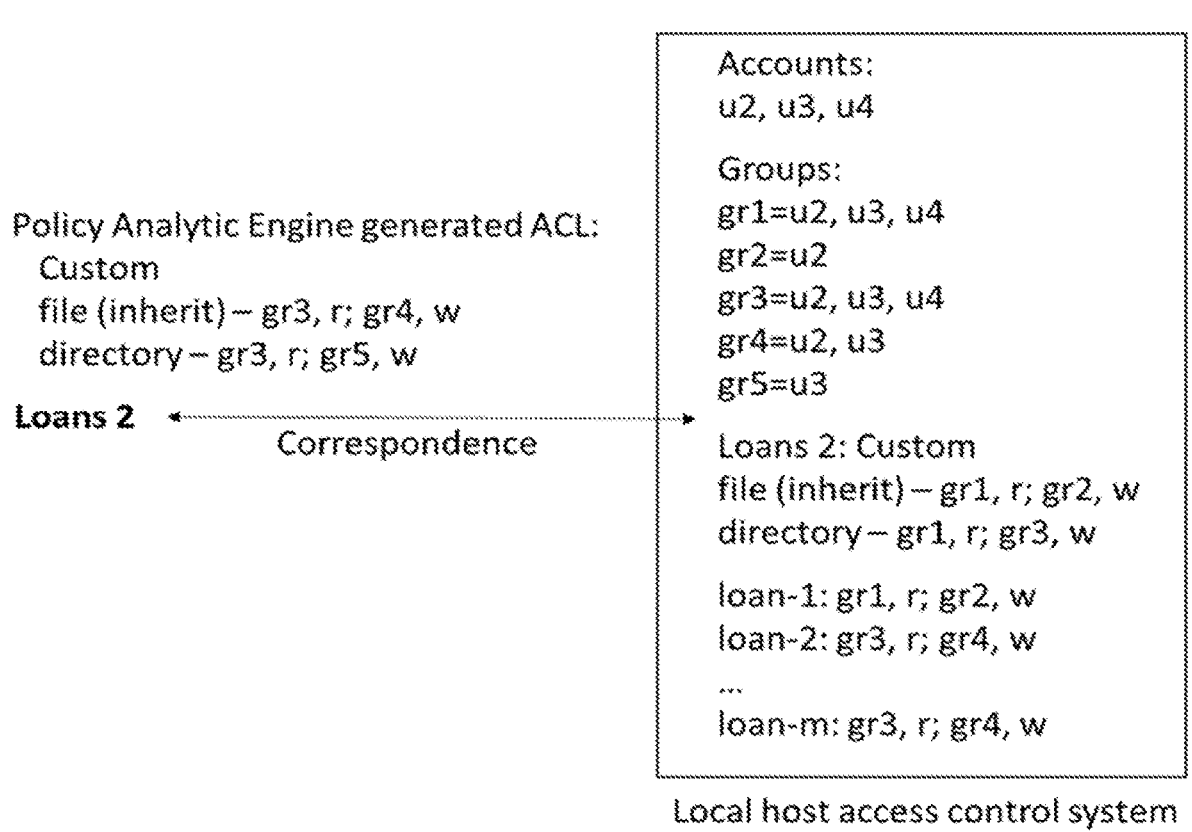
FIG. 12 shows creation of an ACL with associated groups and user accounts in a local host access control system.

Subsequently to creation of access control information pertaining to loans-1 the process could create access control information pertaining to Loans 2, as shown in FIG. 12.

Figure 13:
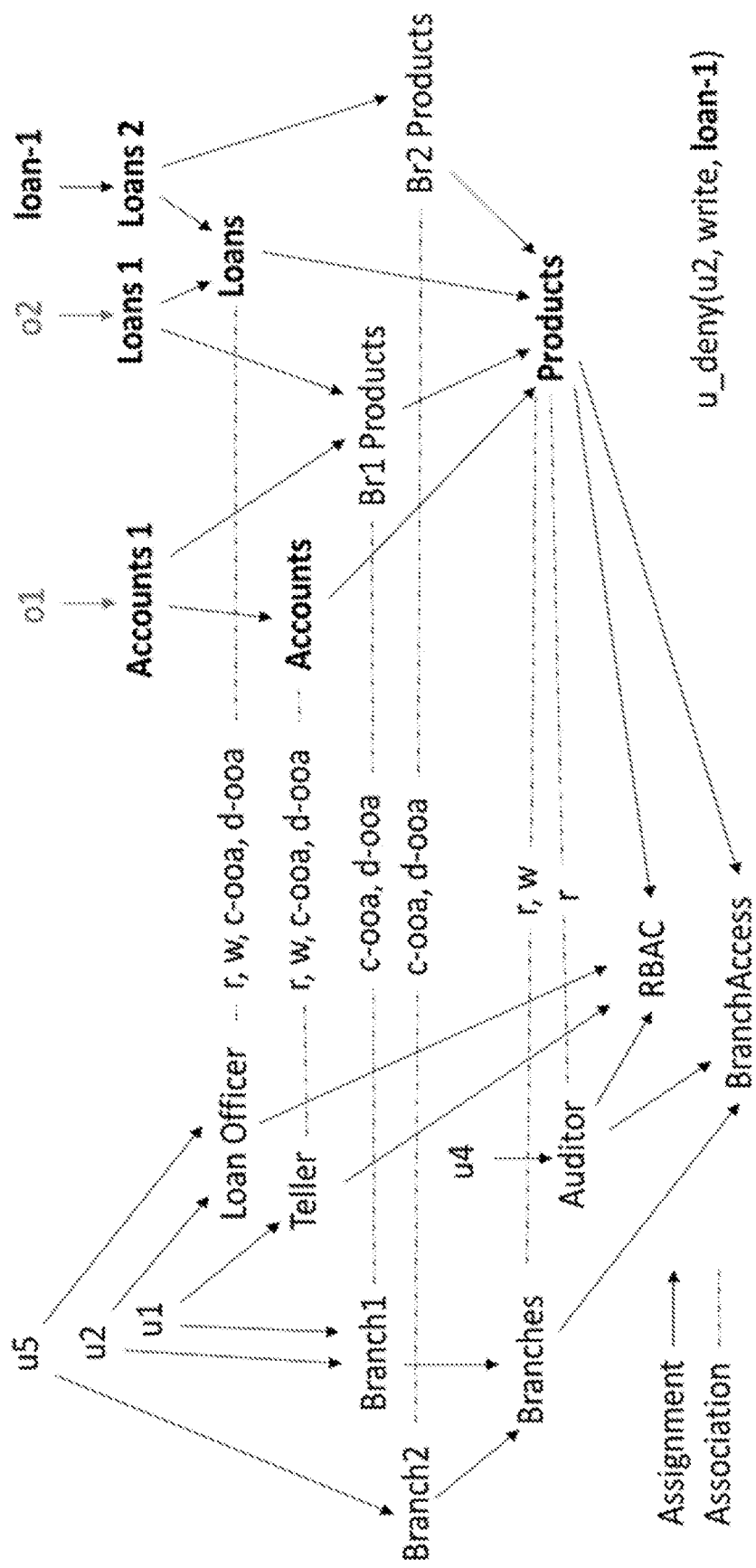
FIG. 13 shows an update of an attribute-based access control (ABAC) policy configuration.

With regard to updating host access control information, as the ABAC policy changes, the process updates appropriate accounts, groups, and ACLs pertaining to affected representations and automatically updates ACLs on corresponding local repositories. An update of the ABAC policy of FIG. 4 is shown in FIG. 13.

Figure 14:
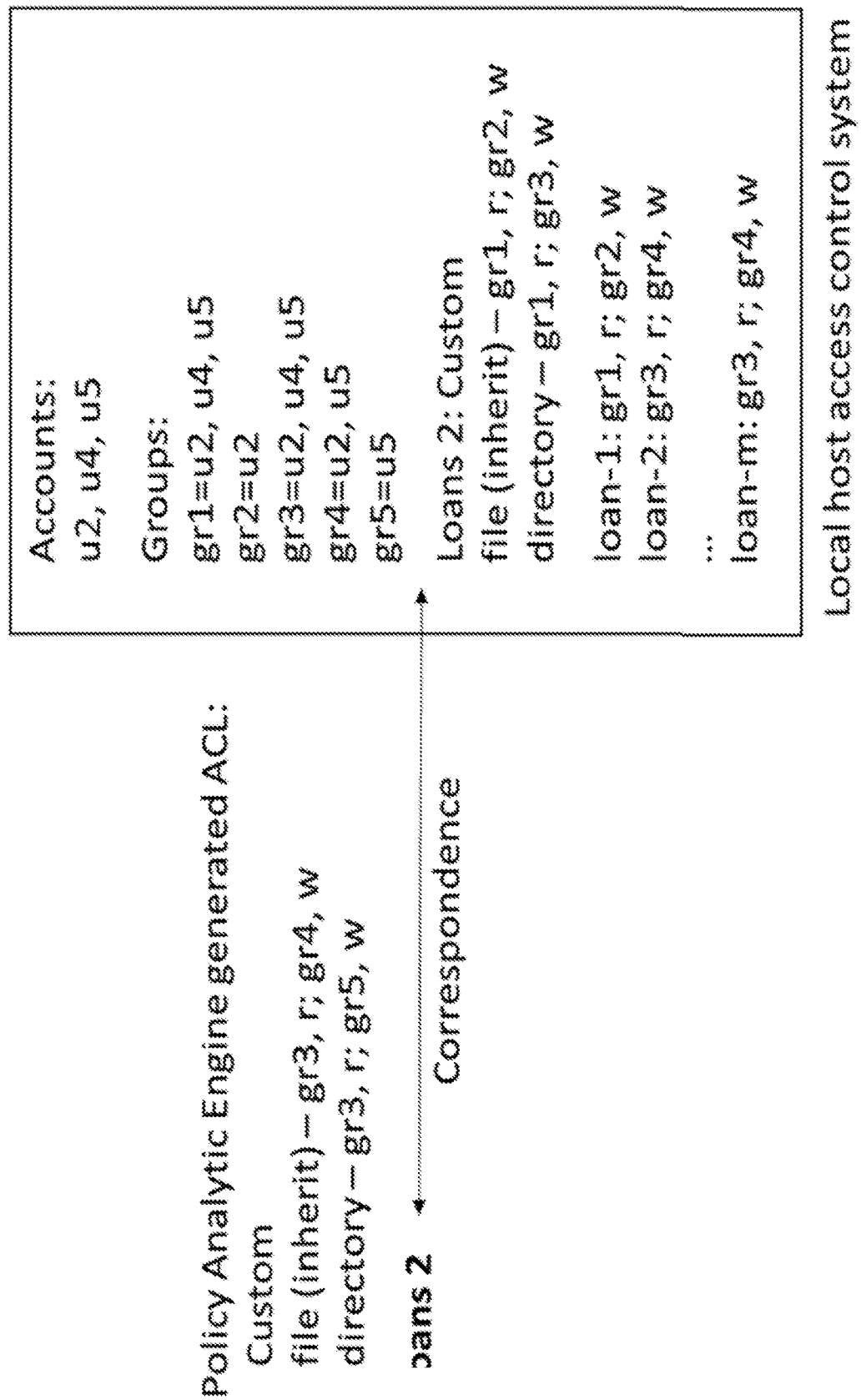
FIG. 14 shows changes to a user account and group information in response to an update of an ABAC policy configuration.

Under the updated policy, user u3 has been deleted and replaced by user u5, a new Loan Officer in Branch 2. Loans 2 is affected by this policy change, and consequently, the logic automatically updates the access control data of the local host access control system as illustrated in FIG. 14.

With regard to system operation, administrators express ABAC policies, introduce representations of local repositories into the policy expression, and instruct the creation of ACLs for repositories through the administrative API of the ABAC control center.

Host users attempt to access repositories in local host systems, and ABAC policies are enforced in those systems in terms of host ACLs managed by the process. Although a single local host can be used in the process, the process can include centralized management of ACLs in multiple hosts, as shown in FIG. 2, wherein each is within an independent administrative domain. Because of this use of ACLs, access decisions are computed, and policy is enforced with an efficiency superior to conventional ABAC systems that include PEP and PDP components.

Although there are architectural similarities with enterprise security management system (ESMS) and role control center (RCC) products, the process herein provides enforcement of ABAC policies using host ACL mechanisms. The enforced policies are based on combinations of user attributes (including but not limited to roles) and object attributes. The ACLs that enforce policy are arrived at not through one-to-one mapping of roles to groups or role permissions to ACLs, but through policy analytics. In particular, the process is based on the determination of a group of users that can access an object or an object in an object attribute with an access right (e.g., read or write) where the source of the group may pertain to a multitude of user attributes.

The process provides centralized management of ABAC policies for resource repositories distributed throughout an enterprise and local enforcement using host ACLs. It includes a centralized control center surrounded by an administrator, a minimum ABAC implementation, and local host systems. Administrators express ABAC policies, introduce representations of local repositories into the policy expression, and instruct the creation of ACLs for repositories as administrative commands using the administrative API of the control center. The minimum ABAC implementation consists of a policy and attribute administration point, policy analytics engine, and database for storing ABAC policies and attributes. The control center maps the authorization data to the various host system ACL mechanisms using the policy analytics engine, through agent software implemented on the host systems. The control center through the policy and attribute administration point can update ABAC policies or attributes stored in the database. In such cases, the control center instructs the policy analytics engine to re-compute ACLs for affected representations. Using agent software, ACLs are updated for corresponding repositories in their host access control systems. Operationally, users attempt to access resources in local host systems, and the ABAC policy is enforced in those systems in terms of their native ACLs. ABAC policy decision and enforcement can be conducted using native host ACL mechanisms.

Embodiments of the subject matter and the operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage medium for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more computers executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, workstations, or any other kind of central processing unit. Generally, a central processing unit will receive instructions and data from a read-only memory or a random-access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic; magneto-optical disks, optical disks, USB drives, and so on. However, a computer need not have such devices. Moreover, a computer can be embedded in another device, e.g., a mobile telephone, a personal digital assistant (PDA), a microwave oven, mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The central processing unit and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks). Such interconnects may involve electrical cabling, fiber optics, or be wireless connections.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

Reference throughout this specification to "one embodiment," "particular embodiment," "certain embodiment," "an embodiment," or the like means that a particular feature, structure, or characteristic described in connection with the embodiment is included in at least one embodiment. Thus, appearances of these phrases (e.g., "in one embodiment" or "in an embodiment") throughout this specification are not necessarily all referring to the same embodiment, but may. Furthermore, particular features, structures, or characteristics may be combined in any suitable manner, as would be apparent to one of ordinary skill in the art from this disclosure, in one or more embodiments.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." Further, the conjunction "or" is used to link objects of a list or alternatives and is not disjunctive; rather the elements can be used separately or can be combined together under appropriate circumstances. It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

What is claimed is:

1. An access control system for managing and enforcing an attribute-based access control (ABAC) policy, the access control system comprising:
    a hardware processor configured for a minimum ABAC implementation that produces a representation access control list (RACL) in an ABAC policy system, such that the RACL is produced exclusively by the minimum ABAC implementation, in communication with a control center, independent of a local host system that protects data using a resource repository access control list (RRACL), and the production of the RACL is based next generation access control (NGAC) in accordance with ANSI INCITS 525 (December 2017), the minimum ABAC implementation consisting essentially of:
        a policy and attribute administration point that receives a policy command and a produces builder command in response to receipt of the policy command;
        a policy analytics engine that receives an engine command and produces an analytics command in response to receipt of engine command; and
        a policy database that receives the builder command from the policy and attribute administration point and receives the analytics command from the policy analytics engine; and the local host system that produces a resource repository access control list (RRACL) in the local host system such that the RRACL is based on the RACL.

2. An access control system for managing and enforcing an attribute-based access control (ABAC) policy, the access control system comprising;
    a control center that:
        receives an administrative command;
        produces a policy command;
        produces an engine command; and
        produces an agent command;
    a hardware processor configured for a minimum ABAC implementation, in communication with the control center, independent of a local host system that protects data using a resource repository access control list (RRACL) and comprising:
        a policy and attribute administration point that:
            receives the policy command from the control center; and
            produces a builder command in response to receipt of the policy command;
        a policy analytics engine that:
            receives the engine command from the control center;
            produces an analytics command in response to receipt of the engine command; and
            produces a representation access control list (RACL) for an object or an object attribute, the object or the object attribute being a representation of and a one-to-one correspondence to a resource repository' in a tile system on the local host system, the local host system protecting the resource repository' based on the RRACL that corresponds to a RACL; a policy database that:
            receives the builder command from the policy and attribute administration point;
            produces an ABAC attribute, based on the builder command;
            produces an ABAC policy, based on the builder command and the ABAC attribute;
            stores the ABAC attribute and the ABAC policy;
            produces the object that is assigned to the object attribute, based on the builder command;
            produces a user that is assigned to a user attribute, based on the builder command:
            receives the analytics command from the policy analytics engine; and
            reviews the ABAC policy and the ABAC attribute, based on analytics command; and
    a local host system in communication with the control center and comprising:
        an agent, running with administrative privileges, that:
            receives the agent command from the control center; and
            produces a file command and an access command in response to receipt of the agent command,
            the file command comprising:
                an instruction to navigate the resource repository on the file system; and
                an instruction to select the resource repository on the file system to be subject to protection by the local host system, based on the RACL; and
        the file system comprising the resource repository and that receives the file command; and
        an access control system that:
            receives the access command from the agent; and produces a resource repository access control list (RRACL) based on the RACL, the RRACL comprising a group that comprises a user.

3. A process for managing and enforcing an attribute-based access control (ABAC) policy, the process comprising:
expressing the ABAC policy, wherein the ABAC policy defines privileges of a user, or privileges and prohibitions, of the user using a policy and attribute administration point for configuring authorization data of a centralized ABAC system, the centralized ABAC system defining policies in terms of objects and object attributes;
introducing a representation of a resource repository into an expression of the ABAC policy as objects or object attributes, the resource repository to be protected in a local host system that protects data using a resource repository access control list (RRACL), and configuring a minimum ABAC implementation consisting essentially of a policy and attribute administration point, a policy analysis engine and a policy database and producing a representation access control list (RACL) in the ABAC policy system independent of the local host system;
establishing a one-to-one correspondence between the resource repository and the representation of the resource repository;
formulating a representation access control list (RACL) for the representation in accordance with the ABAC policy by determining a group of users that can exercise an access right relevant for the representation, the access right comprising an action performable on a resource repository, the action comprising read, write, list, create, or delete;
producing a local group on the local host system, the local group comprising a user member and a local group corresponding to a group in the RACL;
hosting, on the local host system, the resource repository that corresponds to the representation;
producing, with agent software, a user account if the user account does not exist for the user member of the local group on the local host system that hosts the resource repository corresponding to the representation, the local group and the user member corresponding to a user and a group in the RACL; and
producing the RRACL on the resource repository corresponding to the representation using the RACL for the representation and agent software.

4. The process of claim 3, further comprising:
altering the expression of the ABAC policy using the policy and attribute administration point of the centralized AB AC system;
mandating the update of the RACL if the representation is affected by altering the expression of the ABAC policy; and
updating, using agent software, a group membership, a user account, and the RRACL on the local host system that has the resource repository that corresponds to the representation that is affected by altering the expression of the ABAC policy.

5. A process for managing and enforcing an attribute-based access control (ABAC) policy, the process comprising:
receiving, by a control center, an administrative command from an administrator;
producing, by the control center, a policy command, an engine command, and an agent command in response to receipt of the administrative command;
communicating the policy command and the engine command from the control center to a minimum ABAC implementation consisting essentially of a policy and attribute administration point, a policy analysis engine and a policy database, wherein the minimum ABAC implementation produces a representation access control list (RACL) in the ABAC policy system independent of a local host system that protects data using a resource repository access control list (RRACL);
communicating a builder response and an engine response from the minimum ABAC implementation to the control center in response to receipt of the policy command and the engine command;
communicating the agent command from the control system to the local host system;
communicating an agent response from the local host system to the control center in response to receipt of the agent command; and
granting or denying access, by the control center, to an administrator based on the builder response, the engine response, and the agent response to manage and enforce the ABAC policy.

6. The process for managing and enforcing the ABAC policy of claim 5, further comprising
receiving, by a policy and attribute administration point, the policy command from the control center;
producing, by the policy and attribute administration point, a builder command in response to receipt of the policy command;
receiving, by a policy database, the builder command;
producing, by the policy database, a builder database response in response to receipt of the builder command;
receiving, by the policy and attribute administration point, the builder database response from the policy database;
producing, by the policy and attribute administration point, the builder response in response to receipt of the builder database response; and
communicating the builder response from the policy and attribute administration point to the control center.

7. The process for managing and enforcing the ABAC policy of claim 5, further comprising:
receiving, by a policy analytics engine, the engine command from the control center;
producing, by the policy analytics engine, an analytics command in response to receipt of the engine command;
receiving, by a policy database, the analytics command;
producing, by the policy database, an analytics database response in response to receipt of the analytics command;
receiving, by the policy analytics engine, the analytics database response from the policy database;
producing, by the policy analytics engine, the engine response in response to receipt of the analytics database response; and
communicating the engine response from the policy and attribute administration point to the control center.

8. The process for managing and enforcing the ABAC policy of claim 5, further comprising:
receiving, by an agent of the local host system, the agent command;
producing, by the agent, a file command in response to receipt of the agent command;

receiving, by a file system, the file command from the agent; and producing, by the file system, a file response in response to receipt of the file command.

9. The process for managing and enforcing the ABAC policy of claim 7, further comprising:

producing, by the agent, an access command in response to receipt of the agent command;

receiving, by an access control system, the access command from the agent; and producing, by the access control system, an access response in response to receipt of the access command.

10. The process for managing and enforcing the ABAC policy of claim 5, further comprising producing, by the agent, the agent response in response to receipt of the file response or the access response; and communicating the agent response from the agent to the control center.

11. The process for managing and enforcing the ABAC policy of claim 5, further comprising:

communicating a control center response from the control center to the administrator in response to receipt, by the control center, of the builder response, the engine response, the agent response, or a combination comprising at least one of the foregoing responses.

* * * * *